United States Patent
Yan et al.

(10) Patent No.: US 10,939,285 B2
(45) Date of Patent: Mar. 2, 2021

(54) NOTIFICATION METHOD, NOTIFICATION APPARATUS, AND SYSTEM

(71) Applicant: HUAWEI TECHNOLOGIES CO., LTD., Guangdong (CN)

(72) Inventors: Le Yan, Shanghai (CN); Hongping Zhang, Shanghai (CN); Mingzeng Dai, Shanghai (CN); Zheng Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 58 days.

(21) Appl. No.: 16/045,017

(22) Filed: Jul. 25, 2018

(65) Prior Publication Data
US 2018/0332468 A1 Nov. 15, 2018

Related U.S. Application Data

(63) Continuation of application No. PCT/CN2016/072214, filed on Jan. 26, 2016.

(51) Int. Cl.
| | |
|---|---|
| *H04W 8/26* | (2009.01) |
| *H04W 72/04* | (2009.01) |
| *H04W 8/08* | (2009.01) |
| *H04L 12/24* | (2006.01) |
| *H04W 36/08* | (2009.01) |

(Continued)

(52) U.S. Cl.
CPC .......... *H04W 8/26* (2013.01); *H04L 41/0803* (2013.01); *H04W 8/08* (2013.01); *H04W 36/08* (2013.01); *H04W 48/08* (2013.01); *H04W 72/04* (2013.01); *H04W 92/20* (2013.01)

(58) Field of Classification Search
CPC ......... H04W 8/26; H04W 8/08; H04W 36/08; H04W 48/08; H04W 72/04; H04W 92/20; H04L 41/0803
See application file for complete search history.

(56) References Cited

U.S. PATENT DOCUMENTS

| | | | |
|---|---|---|---|
| 2014/0126562 A1 | 5/2014 | Gunnarsson et al. | |
| 2014/0348008 A1 | 11/2014 | Li et al. | |

(Continued)

FOREIGN PATENT DOCUMENTS

| | | |
|---|---|---|
| CN | 101772148 A | 7/2010 |
| EP | 2498541 A1 | 9/2012 |
| WO | 2014158069 A1 | 10/2014 |

OTHER PUBLICATIONS

Extended European Search Report issued in European Application No. 16886935.2 dated Oct. 4, 2018, 9 pages.

(Continued)

*Primary Examiner* — Kent Krueger
(74) *Attorney, Agent, or Firm* — Fish & Richardson P.C.

(57) ABSTRACT

The present disclosure relates to a notification method. In one example method, a first base station configures a first cell identity for a first cell. The first cell identity comprises a first identifier field and a second identifier field. A reserved bit in the second identifier field and the first identifier field identify the first base station. A remaining bit in the second identifier field identifies the first cell. The first base station notifies a second base station or a core network device of a part of the first cell identity that identifies the first base station.

13 Claims, 9 Drawing Sheets

(51) Int. Cl.
*H04W 48/08* (2009.01)
*H04W 92/20* (2009.01)

(56) References Cited

U.S. PATENT DOCUMENTS

| | | | |
|---|---|---|---|
| 2014/0349635 A1* | 11/2014 | Lin | H04W 24/02 |
| | | | 455/418 |
| 2016/0007235 A1* | 1/2016 | Xu | H04W 8/26 |
| | | | 370/331 |
| 2016/0050591 A1* | 2/2016 | Israelsson | H04W 36/0061 |
| | | | 370/331 |
| 2017/0156053 A1* | 6/2017 | Hirata | H04W 8/26 |

OTHER PUBLICATIONS

R3-082482 Alcatel-Lucent,"Alignment of Cell-ID coding and eNB-ID coding with CT1",3GPP TSG RAN3#61bis, Prague, Czechia Sep. 30-Oct. 3, 2008,total 6 pages.

International Search Report issued in International Application No. PCT/CN2016/072214 dated Oct. 17, 2016, 22 pages.

ETSI TS 131 111 V14.4.0 (Oct. 2017), "Digital cellular telecommunications system (Phase 2+) (GSM); Universal Mobile Telecommunications System (UMTS); LTE; Universal Subscriber Identity Module (USIM) Application Toolkit (USAT) (3GPP TS 31.111 version 14.4.0 Release 14)," Oct. 2017, 154 pages.

* cited by examiner

… (1) …

NOTIFICATION METHOD, NOTIFICATION APPARATUS, AND SYSTEM

CROSS-REFERENCE TO RELATED APPLICATIONS

This application is a continuation of International Application No. PCT/CN2016/072214, filed on Jan. 26, 2016, the disclosure of which is hereby incorporated by reference in its entirety.

TECHNICAL FIELD

Embodiments of the present invention relate to the communications field, and in particular, to a notification method, a notification apparatus, and a system.

BACKGROUND

Currently, a globally unique identity of a cell in Evolved Universal Terrestrial Radio Access (E-UTRA) is identified by using an evolved cell global identifier (ECGI). Specifically, an ECGI includes a public land mobile network identity (PLMN Identity) and a cell identity. FIG. 1 is a schematic diagram of a cell identity included in an ECGI in the prior art.

In FIG. 1, a cell identity occupies 28 bits in total. 20 high-order bits are configured as a base station identifier (eNB ID) and can identify $2^{20}=1048576 \approx 1.04$ million base stations. 8 low-order bits are configured as a cell identifier (Cell ID) and can identify $2^8=256$ cells.

However, in the foregoing cell identity configuration method, a quantity of eNB IDs is limited within 1.04 million. During communication, when a quantity of base stations that need to be identified is less than 1.04 million, waste occurs. When a quantity of base stations that need to be identified is greater than 1.04 million, communication is limited by the foregoing cell identity configuration method. Similarly, a quantity of cell IDs is limited to 256. When a quantity of cells that can be supported by one base station is less than 256, waste occurs. When a quantity of cells that can be supported by one base station is greater than 256, communication is also limited.

SUMMARY

Embodiments of the present invention provide a notification method, a notification apparatus, and a base station, to flexibly configure an eNB ID and a cell ID that are included in a cell identity and send the eNB ID and the cell ID, so that the cell identity meets a communication requirement.

According to one aspect, an embodiment of the present invention provides a notification method, including: configuring, by a first base station, a first cell identity for a first cell, where the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell; and notifying, by the first base station, a second base station or a core network device of a part used to identify the first cell in the first cell identity or a part used to identify the first base station in the first cell identity.

In a possible design, the notifying, by the first base station, a second base station or a core network device of a part used to identify the first cell in the first cell identity or a part used to identify the first base station in the first cell identity includes: sending, by the first base station, the first cell identity to the second base station or the core network device; and sending, by the first base station, first indication information to the second base station or the core network device, where the first indication information is used to indicate a location of the part used to identify the first base station in the first cell identity or is used to indicate a location of the part used to identify the first cell in the first cell identity.

In another possible design, the notifying, by the first base station, a second base station or a core network device of a part used to identify the first cell in the first cell identity or a part used to identify the first base station in the first cell identity includes: sending, by the first base station, an identifier of the first base station to the second base station or the core network device.

In another possible design, in a procedure of cell handover, cell reconstruction, or configuration transfer between different base stations, the first base station may further obtain a second cell identity of a second cell, where the second cell identity includes a third identifier field and a fourth identifier field, and a reserved bit in the third identifier field and the fourth identifier field are used to identify the second cell and a remaining bit in the third identifier field is used to identify the second base station, or a reserved bit in the fourth identifier field and the third identifier field are used to identify the second base station and a remaining bit in the fourth identifier field is used to identify the second cell; and the first base station notifies the second base station or the core network device of a part used to identify the second cell in the second cell identity or a part used to identify the second base station in the second cell identity, where the second cell belongs to the second base station.

In another optional design, the first cell identity includes 28 bits, the first identifier field includes 20 bits, the second identifier field includes 8 bits, the reserved bit in the first identifier field includes X bits, where $1 \leq X < 20$ and X is an integer, and the reserved bit in the second identifier field includes Y bits, where $1 \leq Y < 8$ and Y is an integer.

According to another aspect, an embodiment of the present invention provides a notification method, including: configuring, by a first base station, a first cell identity for a first cell, where the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell, where the first cell belongs to the first base station; and notifying, by the first base station, a terminal of the first cell identity.

In another optional design, the first base station notifies a second base station or a core network device of a part used to identify the first cell in the first cell identity or a part used to identify the first base station in the first cell identity.

In another optional design, the notifying, by the first base station, a second base station or a core network device of a part used to identify the first cell in the first cell identity or a part used to identify the first base station in the first cell identity includes: sending, by the first base station, the first cell identity to the second base station or the core network device; and sending, by the first base station, first indication information to the second base station or the core network device, where the first indication information is used to indicate a location of the part used to identify the first base station in the first cell identity or is used to indicate a location of the part used to identify the first cell in the first cell identity.

In another optional design, the notifying, by the first base station, a second base station or a core network device of a part used to identify the first cell in the first cell identity or a part used to identify the first base station in the first cell identity includes: sending, by the first base station, an identifier of the first base station to the second base station or the core network device.

In another optional design, in a procedure of cell handover, cell reconstruction, or configuration transfer between different base stations, the base station may further obtain a second cell identity of a second cell, where the second cell identity includes a third identifier field and a fourth identifier field, and a reserved bit in the third identifier field and the fourth identifier field are used to identify the second cell and a remaining bit in the third identifier field is used to identify the second base station, or a reserved bit in the fourth identifier field and the third identifier field are used to identify the second base station and a remaining bit in the fourth identifier field is used to identify the second cell; and the first base station notifies the second base station or the core network device of a part used to identify the second cell in the second cell identity or a part used to identify the second base station in the second cell identity, where the second cell belongs to the second base station.

According to another aspect, an embodiment of the present invention provides a notification method. The method includes: receiving, by a terminal, an evolved cell global identifier ECGI that is of a first cell and that is notified by a first base station, where the ECGI includes a public land mobile network identity and a cell identity, the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell, where the first cell belongs to the first base station; and recognizing, by the terminal, the first cell based on the ECGI.

According to another aspect, an embodiment of the present invention provides a notification method, including:
configuring, by a first base station, a cell identity for a first cell, where the cell identity includes a first identifier field, a second identifier field, and a third identifier field, and the first identifier field and the second identifier field are used to identify the first base station and the third identifier field is used to identify the first cell, or the first identifier field is used to identify the first base station and the second identifier field and the third identifier field are used to identify the first cell; and
notifying, by the first base station, a second base station or a core network device of a part used to identify the first cell in the cell identity or a part used to identify the first base station in the cell identity.

In a possible design, the first base station separately notifies the second base station or the core network device of the second identifier field.

In another possible design, the first base station notifies the second base station or the core network device of the three identifier fields, and indicates information about the second identifier field.

According to another aspect, an embodiment of the present invention provides a notification method, including:
configuring, by a first base station, a cell identity for a first cell, where the cell identity includes a first identifier field, a second identifier field, and a third identifier field, and the first identifier field and the second identifier field are used to identify the first base station and the third identifier field is used to identify the first cell, or the first identifier field is used to identify the first base station and the second identifier field and the third identifier field are used to identify the first cell; and
sending, by the first base station, information about the second identifier field to a terminal.

According to another aspect, an embodiment of the present invention provides a notification method, including:
receiving, by a terminal, an evolved cell global identifier ECGI that is of a first cell and that is notified by a first base station, where the ECGI includes a public land mobile network identity and a cell identity, and the cell identity includes a first identifier field and a third identifier field;
receiving, by the terminal, information that is about a second identifier field and that is sent by the first base station; and
determining, by the terminal, the first cell based on the ECGI and the information about the second identifier field, where
a combination of the first identifier field and the second identifier field is used to identify the first base station, and the third identifier field is used to identify the first cell; or the first identifier field is used to identify the first base station, and a combination of the second identifier field and the third identifier field is used to identify the first cell.

According to another aspect, the present invention provides a notification method, including:
configuring, by a first base station, base station identifiers used to identify the first base station, where there are at least two base station identifiers and the at least two base station identifiers are different from each other; and
sending, by the first base station, first information to a second base station or a core network device, where the first information is used to indicate that at least two of the base station identifiers are used to identify the first base station.

According to another aspect, an embodiment of the present invention provides a base station. The base station has a function of implementing behaviors of the first base station in the foregoing method design. The function may be implemented by hardware, or may be implemented by hardware executing corresponding software. The hardware or software includes one or more units corresponding to the foregoing function.

In a possible design, a structure of the base station includes a processor and a transmitter. The processor is adapted to support the first base station to perform a corresponding function in the foregoing method. The transmitter is adapted to: support communication between the first base station and a terminal, and send information or an instruction included the foregoing method to the terminal. The base station may further include a memory. The memory is adapted to: be coupled to the processor, and store a program instruction and data that are necessary to the base station.

According to still another aspect, an embodiment of the present invention provides a terminal. The terminal has a function of implementing behaviors of the terminal in the foregoing method design. The function may be implemented by hardware, or may be implemented by hardware executing corresponding software. The hardware or software includes one or more units corresponding to the foregoing function.

In a possible design, a structure of the terminal includes a receiver and a processor. The processor is adapted to support the terminal to perform a corresponding function in the foregoing method. The receiver is adapted to: support communication between the terminal and a base station, and receive information or an instruction that is included in the foregoing method and that is sent by the base station. The terminal may further include a memory. The memory is adapted to: be coupled to the processor, and store a program instruction and data that are necessary to the terminal.

According to still another aspect, an embodiment of the present invention provides a communications system. The system includes the base station and the terminal that are described in the foregoing aspects.

According to yet another aspect, an embodiment of the present invention provides a computer storage medium, adapted to store a computer software instruction used by the foregoing base station, where the computer software instruction includes a program designed to be used to perform the foregoing aspects.

According to yet another aspect, an embodiment of the present invention provides a computer storage medium, adapted to store a computer software instruction used by the foregoing terminal, where the computer software instruction includes a program designed to be used to perform the foregoing aspects.

According to yet another aspect, an embodiment of the present invention provides a chip system, including: at least one processor, a memory, an input/output part, and a bus. The at least one processor obtains an instruction in the memory by using the bus, so as to implement a designed function of a base station in the foregoing method designs.

According to yet another aspect, an embodiment of the present invention provides a chip system, including: at least one processor, a memory, an input/output part, and a bus. The at least one processor obtains an instruction in the memory by using the bus, so as to implement a designed function of a terminal in the foregoing method designs.

According to the notification method, the notification apparatus, and the base station that are provided in the embodiments of the present invention, when the first cell identity is configured for the first cell belonging to the first base station, and when a total length of the cell identity remains unchanged, the cell identity is flexibly configured through bit borrowing. In this process, a limitation in the prior art that 20 high-order bits in a 28-bit cell identity are used to identify eNBs and 8 low-order bits are used to identify cells is broken, and the cell identity is flexibly configured through bit borrowing, so that a part used to identify eNBs in the cell identity is not limited to 20 high-order bits and a part used to identify cells is not limited to 8 low-order bits. In this way, when more than 20 bits in a 28-bit cell identity are used to identify eNBs, a quantity of eNBs that can be identified by the cell identity exceeds a limitation of 1.04 million in the prior art, and the quantity of eNBs that can be identified by the cell identity is greatly increased, so that the cell identity meets a communication requirement. Similarly, when more than 8 bits in a 28-bit cell identity are used to identify cells, a quantity of cells that can be identified by the cell identity exceeds a limitation of 256 in the prior art, and the quantity of cells that can be identified by the cell identity is greatly increased, so that the cell identity meets a communication requirement. In addition, in this process, when a quantity of cells supported by an eNB is less than 256, less than 8 bits in the 28-bit cell identity are used to identify the cells, so as to reduce signaling waste.

DESCRIPTION OF EMBODIMENTS

Figure 1:
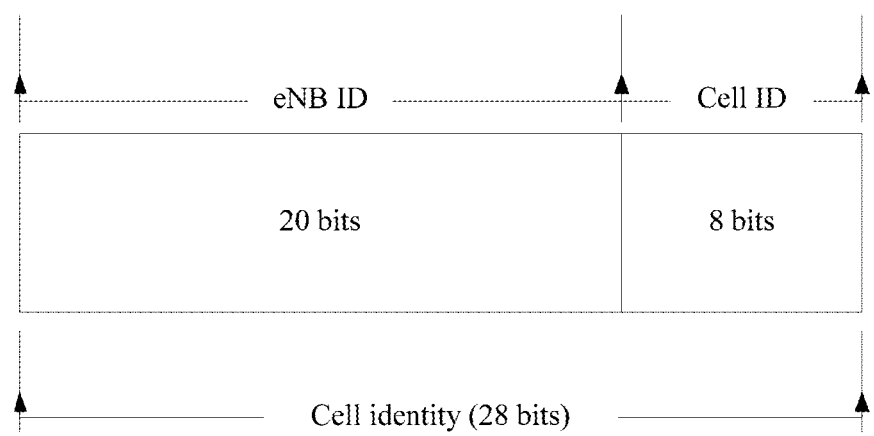
FIG. 1 is a schematic diagram of a cell identity included in an ECGI in the prior art.

Referring to FIG. 1, a cell identity occupies 28 bits in total. 20 high-order bits are configured as a base station identifier (eNB ID) and can identify $2^{20}=1048576\approx1.04$ million base stations. 8 low-order bits are configured as a cell identifier (Cell ID) and can identify $2^{8}=256$ cells. It is learned through research that a cell identity configuration method shown in FIG. 1 imposes a limitation on communication to some extent. For example, to improve a capacity of a base station in E-UTRA network coverage, an operator performs capacity expansion through site encryption. In this case, capacities of the approximate 1.04 million base stations cannot meet a requirement of the operator. In other words, the eNB ID included in the cell identity cannot meet the requirement. For another example, when there are relatively a few carriers, waste occurs in the 8-bit cell ID included in the cell identity. For example, when a conventional distributed base station performs networking by using three sectors, a maximum quantity of cells supported by one base station may be far less than 256. For another example, an existing bandwidth based unit (BBU) supports 144 cells at most, and a next-generation baseband board of the BBU has a stronger capability and supports 288 cells at most. For another example, a maximum quantity of cells supported in a cloud radio access network (CRAN) scenario reaches 576, but the 8-bit cell ID included in the cell identity supports only 256 cells at most.

In view of this, an embodiment of the present invention provides a notification method. An eNB ID and a cell ID included in a cell identity are flexibly configured and notified to another network element such as a base station or a core network device, so that the cell identity meets a communication requirement.

A technology described in this specification may be applied to various communications systems, for example, current 2G and 3G communications systems and a next-generation communications system such as a Global System for Mobile communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single carrier-FDMA (SC-FDMA) system, a General Packet Radio Service (GPRS) system, a Long Term Evolution (LTE) system, an E-UTRA system, and another communications system of this type.

A terminal included in this application may be a wireless terminal or a wired terminal. The wireless terminal may be a device that provides voice and/or data connectivity for a user, a handheld device having a wireless connection function, or another processing device connected to a wireless modem. The wireless terminal may communicate with one or more core networks by using a radio access network (RAN). The wireless terminal may be a mobile terminal such as a mobile phone (or referred to as a "cellular" phone) or a computer having a mobile terminal, for example, may be a portable, a pocket-sized, a handheld, a computer built-in, or an in-vehicle mobile apparatus that exchanges voice and/or data with the radio access network. For example, the wireless terminal may be a device such as a personal communication service (PCS) phone, a cordless phone, a Session Initiation Protocol (SIP) phone, a wireless local loop (WLL) station, or a personal digital assistant PDA). The wireless terminal may also be referred to as a system, a subscriber unit, a subscriber station, a mobile station, a mobile, a remote station, an access point, a remote terminal, an access terminal, a user terminal, a user agent, a user device, or user equipment.

A base station included in this application may be a device that communicates with a wireless terminal over an air interface in an access network by using one or more sectors. The base station may be adapted to perform mutual conversion on a received air frame and an IP packet, and is used as a router between the wireless terminal and the other parts of the access network. The other parts of the access network may include an Internet Protocol (IP) network. The base station may further coordinate attribute management on the air interface. For example, the base station may be a base transceiver station (BTS) in GSM or CDMA, or a NodeB in WCDMA, or an evolved NodeB (NodeB or eNB or e-NodeB, evolutional Node B) in LTE. This is not limited in this application.

A core network device included in this application is an apparatus deployed in a CN to implement functions of a terminal, such as Internet Protocol (IP) address assignment, packet filtering, and mobility management. In systems using different radio access technologies, the core network device may have different specific names. For example, in an LTE network, the core network device is referred to as a mobility management entity (MME).

For ease and clarity of description, the technical solutions of the present invention are described below in detail by using an example in which a system architecture is specifically an E-UTRA system and a base station is specifically an eNB. For details, refer to FIG. 2.

Figure 2:
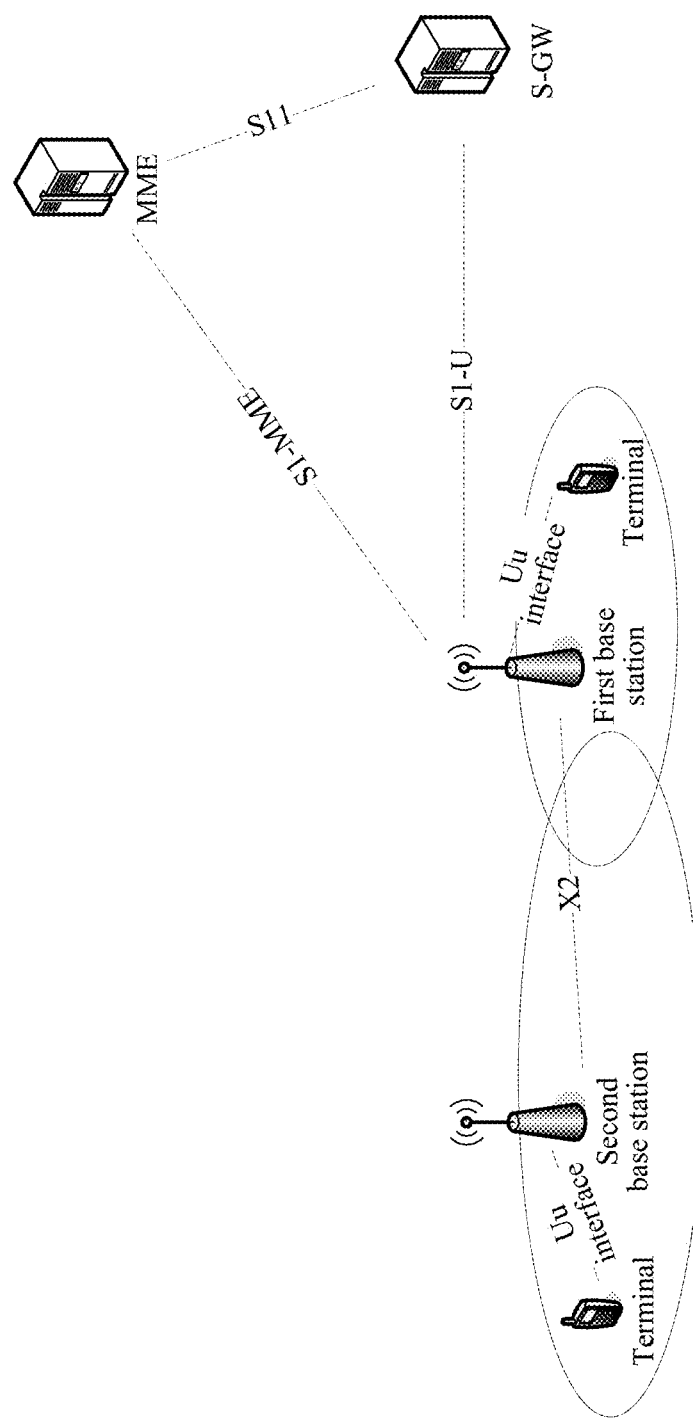
FIG. 2 is a schematic architectural diagram of an E-UTRA system to which a notification method is applicable according to the present invention.

FIG. 2 is a schematic architectural diagram of an E-UTRA system to which a notification method is applicable according to the present invention. As shown in FIG. 2, in this embodiment of the present invention, a base station (eNB) communicates, based on an S1 interface protocol, with a core network device such as a mobility management entity (MME) or a serving gateway (S-GW) (only communication between a first base station and each of the MME and the S-GW is shown in the figure). The MME communicates with the S-GW based on an S11 interface protocol. Base stations communicate with each other based on an X2 interface protocol. The notification method in the present invention is described below in detail based on FIG. 2.

Embodiment 1

Figure 3:
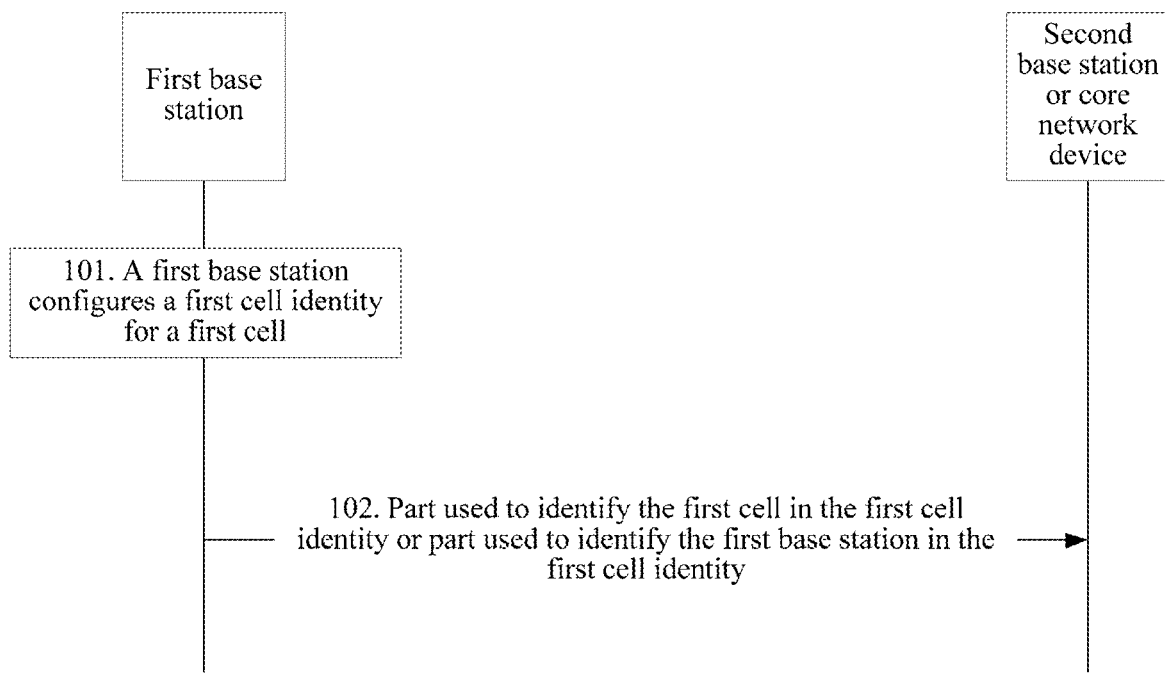
FIG. 3 is a first method flowchart of Embodiment 1 of a notification method according to the present invention.

FIG. 3 is a first method flowchart of Embodiment 1 of a notification method according to the present invention. In this embodiment, a first base station interacts with a second base station or a core network device. This is applicable to a scenario in which the first base station needs to flexibly configure a cell identity of a cell in a process of communicating with the core network device or the second base station. Specifically, this embodiment includes the following steps.

101: The first base station configures a first cell identity for a first cell. The first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell.

In this embodiment of the present invention, the first base station is an eNB, and the first cell is, for example, any cell that belongs to the first base station. In the prior art, a sum of a length of the first identifier field and a length of the second identifier field is a total length of the first cell identity, the first identifier field is used to identify the first base station, and the second identifier field is used to identify the first cell. In this step, when the total length of the first cell identity remains unchanged, the cell identity is flexibly configured through bit borrowing.

Figure 4A:
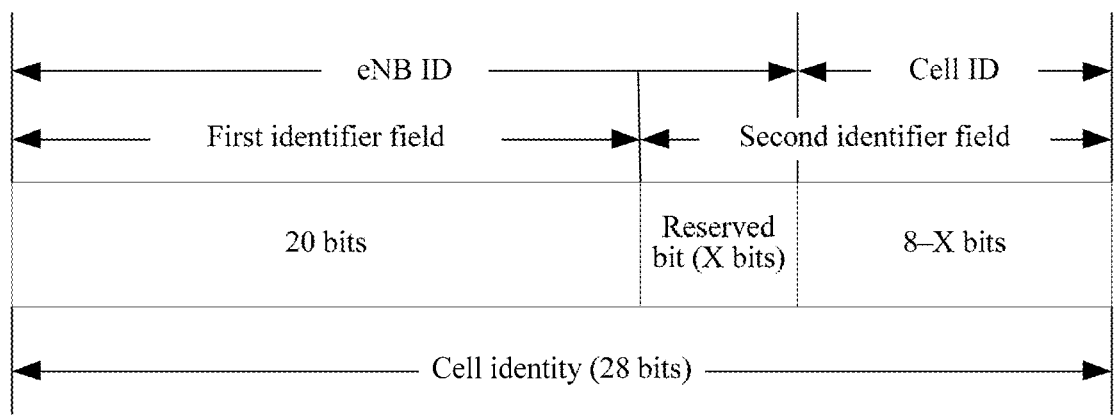
FIG. 4A is a schematic diagram of a cell identity in Embodiment 1 of the notification method according to the present invention.

For example, when a quantity of base stations that need to be identified is limited in a communication process, the first base station combines the reserved bit in the second identifier field originally used to identify the first cell in the first cell identity with the first identifier field, in other words, identifies the first base station by using a combination of the reserved bit in the second identifier field and the first identifier field. The reserved bit in the second identifier field is, for example, Y high-order bits in the second identifier field, and Y is an integer and is less than the length of the second identifier field. Specifically, referring to FIG. 4A, FIG. 4A is a schematic diagram of a cell identity in Embodiment 1 of the notification method according to the present invention. As shown in FIG. 4A, when the first cell identity specifically includes 28 bits, the first identifier field includes 20 bits, and the second identifier field includes 8 bits, Y bits (reserved bits) in the second identifier field may be combined with the 20-bit first identifier field to identify the first base station, and the remaining bit, in other words, 8−Y bits, in the second identifier field is used to identify the first cell.

Figure 4B:
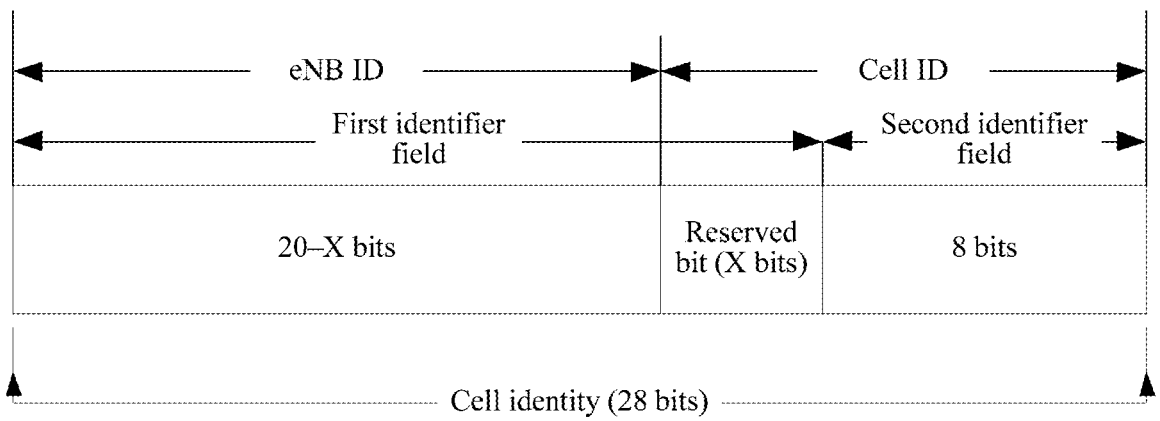
FIG. 4B is a schematic diagram of another cell identity in Embodiment 1 of the notification method according to the present invention.

For another example, when a quantity of cells that need to be identified is limited in a communication process, the first base station combines the reserved bit in the first identifier field originally used to identify the first base station in the first cell identity with the second identifier field, in other words, identifies the first cell by using a combination of the reserved bit in the first identifier field and the second identifier field. The reserved bit in the first identifier field is, for example, X low-order bits in the first identifier field, and X is an integer and is less than the length of the first identifier field. Specifically, referring to FIG. 4B, FIG. 4B is a schematic diagram of another cell identity in Embodiment 1 of the notification method according to the present invention. As shown in FIG. 4B, when the first cell identity specifically includes 28 bits, the first identifier field includes 20 bits, and the second identifier field includes 8 bits, X bits (reserved bits) in the first identifier field may be combined with the 8-bit second identifier field to identify the first cell, and the remaining bit, in other words, 20−X bits, in the first identifier field is used to identify the first base station.

102: The first base station notifies a second base station or a core network device of a part used to identify the first cell in the first cell identity or a part used to identify the first base station in the first cell identity.

After configuring the first cell identity for the first cell, the first base station notifies the second base station or the core network device of the part used to identify the first cell in the first cell identity or the part used to identify the first base station in the cell identity of the first cell. In the notification process, both or one of the two parts is sent based on a requirement.

According to the notification method provided in this embodiment of the present invention, when the cell identity is configured for the first cell belonging to the first base station, and when the total length of the cell identity remains unchanged, the cell identity is flexibly configured through bit borrowing. In this process, a limitation in the prior art that 20 high-order bits in a 28-bit cell identity are used to identify eNBs and 8 low-order bits are used to identify cells is broken, and the cell identity is flexibly configured through bit borrowing, so that a part used to identify eNBs in the cell identity is not limited to 20 high-order bits and a part used to identify cells is not limited to 8 low-order bits. In this way, when more than 20 bits in a 28-bit cell identity are used to identify eNBs, a quantity of eNBs that can be identified by the cell identity exceeds a limitation of 1.04 million in the prior art, and the quantity of eNBs that can be identified by the cell identity is greatly increased, so that the cell identity meets a communication requirement. Similarly, when more than 8 bits in a 28-bit cell identity are used to identify cells, a quantity of cells that can be identified by the cell identity exceeds a limitation of 256 in the prior art, and the quantity of cells that can be identified by the cell identity is greatly increased, so that the cell identity meets a communication requirement. In addition, in this process, when a quantity of cells supported by an eNB is less than 256, less than 8 bits in the 28-bit cell identity are used to identify the cells, so as to reduce signaling waste.

In the foregoing notification process, the total length of the cell identity remains unchanged, division between an eNB ID and a cell ID in the cell identity is invisible to a terminal, and the terminal only needs to know an ECGI. Therefore, an air interface is not affected. However, the first base station communicates with the second base station by using an X2 protocol, and the first base station communicates with the core network device such as an MME or an S-GW by using an S1 interface protocol. In the foregoing communication process, the second base station or the core network device needs to know a new manner of dividing the cell identity by the first base station, in other words, know the part used to identify the first base station in the cell identity and the part used to identify the first cell. Therefore, the S1 interface protocol and the X2 interface protocol are affected by division between the eNB ID and the cell ID in the first cell identity, and the second base station or the core network device needs to be notified of at least one of the part used to identify the first cell in the first cell identity and the part used to identify the first base station in the first cell identity. Specifically, the notification may be performed in the following three manners.

First manner: The first base station sends the first cell identity to the second base station or the core network device, and the first base station sends first indication information to the second base station or the core network device. The first indication information is used to indicate a location of the part used to identify the first base station in the first cell identity or is used to indicate a location of the part used to identify the first cell in the first cell identity.

In this manner, the first base station notifies the second base station or the core network device of the location of the part used to identify the first base station and/or the location of the part used to identify the first cell in the first cell identity.

For example, referring to FIG. 4A again, when the reserved bit is Y (1≤Y<8) high-order bits in the second identifier field, the first indication information indicates that in the first cell identity whose total length is 28 bits, the location of the part used to identify the first base station is 20+Y high-order bits and the location of the part used to identify the first cell is 8−Y low-order bits.

For another example, referring to FIG. 4B again, when the reserved bit is X (1≤X<20) low-order bits in the first identifier field, the first indication information indicates that in the first cell identity whose total length is 28 bits, the location of the part used to identify the first base station is 20−X high-order bits and the location of the part used to identify the first cell is X+8 low-order bits.

Second manner: The first base station sends an identifier of the first base station to the second base station or the core network device.

In this manner, the first base station directly notifies the second base station or the core network device of the part used to identify the first base station in the first cell identity, in other words, the identifier of the first base station. The part used to identify the first base station in the first cell identity is defined as a new information element (IE). For example, when a quantity of bits used to identify the first base station is less than 20, the part used to identify the first base station may be defined as a reduced eNB ID, and the reduced eNB ID is sent to the second base station or the core network device. In this process, when receiving the newly defined reduced eNB ID, the second base station or the core network device uses the reduced eNB ID as a current identifier of the first base station, to replace the part originally used to identify the first base station in the first cell identity, in other words, the first identifier field.

Third manner: The first base station notifies the second base station or the core network device of a location of the reserved bit.

For example, referring to FIG. 4A again, when the reserved bit is Y ($1 \leq Y < 8$) high-order bits in the second identifier field, the first base station notifies the second base station or the core network device that the location of the reserved bit in the first cell identity is Y high-order bits, in other words, a cell ID is shifted rightward by Y bits, so that in the first cell identity, 8−Y low-order bits are used to identify the first cell, and 20+Y high-order bits are used to identify the first base station.

For another example, referring to FIG. 4B again, when the reserved bit is X ($1 \leq X < 20$) low-order bits in the first identifier field, the first base station notifies the second base station or the core network device that the location of the reserved bit in the first cell identity is X low-order bits, in other words, a cell ID is shifted leftward by X bits, so that in the first cell identity, X+8 low-order bits are used to identify the first cell, and 20−X high-order bits are used to identify the first base station.

Next, the technical solution of the present invention is further described with reference to some specific procedures related to the S1 interface protocol or the X2 interface protocol.

For application of the technical solution of the present invention in S1 interface protocol procedures:

Specifically, IEs affected by the division between the eNB ID and the cell ID in the first cell identity include: a target base station identity (Target ID), a global base station identity (Global eNB ID), an E-UTRAN cell global identifier (E-UTRAN CGI), self-organized network configuration transfer (SON Configuration Transfer), and the like. Affected processes include: handover request, S1 setup request, PWS restart indication, eNB configuration transfer, MME configuration transfer, location report, and the like.

In this case, the first base station notifies the second base station or the core network device of the part used to identify the first cell in the first cell identity or the part used to identify the first base station in the first cell identity.

In addition, when a procedure such as cell handover or cell reconstruction is performed between base stations, the first base station further obtains a second cell identity of a second cell. The second cell identity includes a third identifier field and a fourth identifier field, and a reserved bit in the third identifier field and the fourth identifier field are used to identify the second cell and a remaining bit in the third identifier field is used to identify the second base station, or a reserved bit in the fourth identifier field and the third identifier field are used to identify the second base station and a remaining bit in the fourth identifier field is used to identify the second cell. The first base station notifies the second base station or the core network device of a part used to identify the second cell in the second cell identity or a part used to identify the second base station in the second cell identity. The second cell belongs to the second base station.

During base station configuration transfer, the first base station sends the identifier of the first base station and an identifier of the second base station to the core network device.

Specifically, in the notification process:

For the handover request process, according to the existing 3rd generation partnership project (3GPP) technical standard (TS) 36.413, the target identity (Target ID) is a target global base station identity (Global eNB ID) in an LTE system or an intra System Architecture Evolution (intra System Architecture Evolution, intra SAE) network. In the prior art, the first base station is used as a source base station, and notifies the mobility management entity of a target identity (Target ID) of the second base station. In this embodiment of the present invention, the first base station adds indication information to a handover request message and sends the handover request message to the mobility management entity. The indication information is used to indicate the location of the part used to identify the first base station in the first cell identity or is used to indicate the location of the part used to identify the first cell in the first cell identity. Alternatively, the first base station sends the identifier of the first base station to the mobility management entity.

For the S1 setup request process, in the prior art, the first base station notifies the mobility management entity of a global eNB ID of the first base station. In this embodiment of the present invention, the first base station may send the first cell identity to the mobility management entity, add the first indication information to an S1 setup request message, and send the S1 setup request message to the mobility management entity. The first indication information is used to indicate the location of the part used to identify the first base station in the first cell identity or is used to indicate the location of the part used to identify the first cell in the first cell identity. When the foregoing second manner is used, the first base station sends a current global eNB ID of the first base station to the mobility management entity. The first indication information may be carried in the S1 setup request message.

For the PWS restart indication process, in the prior art, the first base station is used as a source base station, and notifies the mobility management entity of a global base station identity (Global eNB ID) of the first base station and an ECGI of the first cell. In this embodiment of the present invention, when notifying the ECGI of the first cell, the first base station adds the first indication information to a PWS restart indication message and sends the PWS restart indication message to the mobility management entity. The first indication information is used to indicate the location of the part used to identify the first base station in the first cell identity or is used to indicate the location of the part used to identify the first cell in the first cell identity. When notifying the global base station identity (Global eNB ID) of the first base station, the first base station adds indication information to the PWS restart indication message and sends the PWS restart indication message to the mobility management entity. The indication information is used to indicate the location of the part used to identify the first base station in the first cell identity or is used to indicate the location of the part used to identify the first cell in the first cell identity. Alternatively, the first base station sends the identifier of the first base station to the mobility management entity.

For the eNB configuration transfer process, in the prior art, the first base station notifies the mobility management entity of a global eNB ID of the first base station and a global eNB ID of the second base station. In this embodiment of the present invention, indication information is added to an eNB configuration transfer message, and the eNB configuration transfer message is sent to the mobility management entity. The indication information is used to indicate the location of the part used to identify the first base station in the first cell identity or the location of the part used to identify the first cell in the first cell identity, and is used to indicate a location of the part used to identify the second base station in the second cell identity or a location of the part used to identify the second cell in the second cell identity. In another method, the first base station sends the identifier of the first base station and the identifier of the second base station to the mobility management entity.

For the MME configuration transfer process, in the prior art, the mobility management entity notifies the first base station of a global eNB ID of the first base station and a global eNB ID of the second base station. In this embodiment of the present invention, when the foregoing second manner is used, the first base station sends the identifier of the first base station to the mobility management entity.

For the location report process, in the prior art, the first base station notifies the MME of the first cell identity. In this embodiment of the present invention, when the foregoing first manner is used, the first base station adds the first indication information to a location report message and sends the location report message to the mobility management entity. The first indication information is used to indicate the location of the part used to identify the first base station in the first cell identity or is used to indicate the location of the part used to identify the first cell in the first cell identity. For the eNB configuration transfer process, in the prior art, the first base station notifies the mobility management entity of a global eNB ID of the first base station and a global eNB ID of the second base station. In this embodiment of the present invention, indication information is added to an eNB configuration transfer message, and the eNB configuration transfer message is sent to the mobility management entity. The indication information is used to indicate the location of the part used to identify the first base station in the first cell identity or the location of the part used to identify the first cell in the first cell identity, and is used to indicate a location of the part used to identify the second base station in the second cell identity or a location of the part used to identify the second cell in the second cell identity. In another method, the first base station sends the identifier of the first base station and the identifier of the second base station to the mobility management entity.

For the MME configuration transfer process, in the prior art, the mobility management entity notifies the first base station of a global eNB ID of the first base station and a global eNB ID of the second base station. In this embodiment of the present invention, when the foregoing second manner is used, the first base station sends the identifier of the first base station to the mobility management entity.

For the location report process, in the prior art, the first base station notifies the MME of the first cell identity. In this embodiment of the present invention, when the foregoing first manner is used, the first base station adds the first indication information to a location report message and sends the location report message to the mobility management entity. The first indication information is used to indicate the location of the part used to identify the first base station in the first cell identity or is used to indicate the location of the part used to identify the first cell in the first cell identity.

In the S1 interface protocol procedures included in the present invention, for an IE that needs to be obtained by specifying or updating an original IE during interaction, refer to an IE related to a cell identity, an eNB ID, or a cell ID in 9.2.1.6, 9.2.1.37, 9.2.1.38, 9.2.3.26, 9.1.5.1, 9.1.8.4, 9.1.13.5, 9.1.16, 9.1.17, and 9.1.12.3 in the TS36.413.

For application of the technical solution of the present invention in X2 interface protocol procedures:

Before re-division between the eNB ID and the cell ID in the cell identity, a value of a maximum quantity (maxCellineNB) of cells served by the first base station in the existing X2 interface protocol is 256. In this embodiment of the present invention, the maximum quantity of cells served by the first base station may be greater than 256 or less than 256. In this case, affected information elements include an E-UTRAN cell identifier, a global eNB ID, a radio network layer header (RNL Header), and the like. Affected processes include: X2 setup request, X2 setup response X2 release, X2 removal request, X2 removal response, HANDOVER REQUEST, X2 AP information transfer request, load information, eNB configuration update, resource status request, resource status response, resource status failure, resource status update, mobility change request, mobility change acknowledgement, mobility change failure, RLF indication, handover report, cell activation request, cell activation response, and the like.

In this case, to avoid impact caused by division between the eNB ID and the cell ID in the cell identity on the X2 interface protocol, in a process in which the first base station notifies the second base station or the core network device of at least one of the first cell identity and/or the part used to identify the first base station in the first cell identity, a process in which the first base station notifies the second base station or the core network device of at least one of the second cell identity and/or the part used to identify the second base station in the second cell identity, and a process in which the first base station notifies the second base station or the core network device of at least one of the first cell identity or the part used to identify the first base station in the first cell identity and at least one of the second cell identity or the part used to identify the second base station in the second cell identity:

For the X2 setup request process, in the prior art, the first base station notifies the second base station of a global eNB ID of the first base station and an ECGI of a cell managed by a neighboring base station of the first base station. In this embodiment of the present invention, when notifying the ECGI of the cell managed by the neighboring base station of the first base station, the first base station adds indication information to an X2 setup request message and sends the X2 setup request message to the second base station. The indication information is used to indicate a location of a part used to identify the neighboring base station of the first base station in a cell identity of the cell managed by the neighboring base station of the first base station, or is used to indicate a location of a part used to identify the cell managed by the neighboring base station of the first base station in a cell identity of the cell managed by the neighboring base station of the first base station. When notifying the global base station identity (Global eNB ID) of the first base station, the first base station adds indication information to the X2 setup request message and sends the X2 setup request message to the second base station. The indication information is used to indicate the location of the part used to identify the first base station in the first cell identity, or is used to indicate the location of the part used to identify the first cell in the first cell identity. In another method, the first base station sends the identifier of the first base station to the second base station.

For the X2 setup response process, in the prior art, the first base station notifies the second base station of a global eNB ID of the second base station and an ECGI of a cell managed by a neighboring base station of the second base station. In this embodiment of the present invention, when notifying the ECGI of the cell managed by the neighboring base station of the second base station, the first base station adds indication information to an X2 setup response message and sends the X2 setup response message to the second base station. The indication information is used to indicate a location of a part used to identify the neighboring base station of the second base station in a cell identity of the cell managed by the neighboring base station of the second base station, or is used to indicate a location of a part used to identify the cell managed by the neighboring base station of the second base station in a cell identity of the cell managed by the neighboring base station of the second base station. When notifying the global base station identity (Global eNB ID) of the second base station, the first base station adds indication information to the X2 setup response message and sends the X2 setup response message to the second base station. The indication information is used to indicate a location of the part used to identify the second base station in the second cell identity, or is used to indicate a location of the part used to identify the second cell in the second cell identity. In another method, the first base station sends the identifier of the second base station to the second base station.

For the X2 release process, the first base station notifies the second base station of a global base station identity (Global eNB ID) of the first base station. In this embodiment of the present invention, the first base station adds indication information to an X2 release message and sends the X2 release message to the second base station. The indication information is used to indicate the location of the part used to identify the first base station in the first cell identity or is used to indicate the location of the part used to identify the first cell in the first cell identity. In another method, the first base station sends the identifier of the first base station to the second base station.

For the X2 removal request process, the first base station notifies the second base station of a global base station identity (Global eNB ID) of the first base station. In this embodiment of the present invention, the first base station adds indication information to an X2 removal request message and sends the X2 removal request message to the second base station. The indication information is used to indicate the location of the part used to identify the first base station in the first cell identity or is used to indicate the location of the part used to identify the first cell in the first cell identity. In another method, the first base station sends the identifier of the first base station to the second base station.

For the X2 removal response process, the first base station notifies the second base station of a global base station identity (Global eNB ID) of the second base station. In this embodiment of the present invention, the first base station adds indication information to an X2 removal response message and sends the X2 removal response message to the second base station. The indication information is used to indicate a location of the part used to identify the second base station in the second cell identity or is used to indicate a location of the part used to identify the second cell in the second cell identity. In another method, the first base station sends the identifier of the second base station to the second base station.

For the handover request process, in the prior art, the first base station notifies the second base station of an ECGI of the second cell (where the second cell belongs to the second base station). In this embodiment of the present invention, the first base station adds indication information to a handover request message and sends the handover request message to the second base station. The indication information is used to indicate a location of the part used to identify the second base station in the second cell identity or is used to indicate a location of the part used to identify the second cell in the second cell identity.

For the X2 AP information transfer process, in the prior art, the first base station notifies the second base station of a global eNB ID of the first base station and a global eNB ID of the second base station. In this embodiment of the present invention, indication information is added to an X2 AP information transfer message, and the X2 AP information transfer message is sent to the second base station. The indication information is used to indicate the location of the part used to identify the first base station in the first cell identity or the location of the part used to identify the first cell in the first cell identity, and is used to indicate a location of the part used to identify the second base station in the second cell identity or a location of the part used to identify the second cell in the second cell identity. In another method, the first base station sends the identifier of the first base station and the identifier of the second base station to the second base station.

For the load information process, the first base station notifies the second base station of a global base station identity (Global eNB ID) of the first base station. In this embodiment of the present invention, the first base station adds indication information to a load information message and sends the load information message to the second base station. The indication information is used to indicate the location of the part used to identify the first base station in the first cell identity or is used to indicate the location of the part used to identify the first cell in the first cell identity. In another method, the first base station sends the identifier of the first base station to the second base station.

For the eNB configuration update process, in the prior art, the first base station notifies the second base station of an ECGI of a cell managed by a neighboring base station of the first base station. In this embodiment of the present invention, the first base station adds indication information to an eNB configuration update message and sends the eNB configuration update message to the second base station. The indication information is used to indicate a location of a part used to identify the neighboring base station of the first base station in a cell identity of the cell managed by the neighboring base station of the first base station, or is used to indicate a location of a part used to identify the cell managed by the neighboring base station of the first base station in a cell identity of the cell managed by the neighboring base station of the first base station.

For the resource status request process, in the prior art, the first base station notifies the second base station of an ECGI of the second cell (where the second cell belongs to the second base station). In this embodiment of the present invention, the first base station adds indication information to a resource status request message and sends the resource status request message to the second base station. The indication information is used to indicate a location of the part used to identify the second base station in the second cell identity or is used to indicate a location of the part used to identify the second cell in the second cell identity.

For the resource status response process, in the prior art, the first base station notifies the second base station of an ECGI of the first cell. In this embodiment of the present invention, the first base station adds indication information to a resource status response message and sends the resource status response message to the second base station. The indication information is used to indicate the location of the part used to identify the first base station in the first cell identity or is used to indicate the location of the part used to identify the first cell in the first cell identity.

For the resource status failure process, in the prior art, the first base station notifies the second base station of an ECGI of the first cell. In this embodiment of the present invention, the first base station adds indication information to a resource status failure message and sends the resource status failure message to the second base station. The indication information is used to indicate the location of the part used to identify the first base station in the first cell identity or is used to indicate the location of the part used to identify the first cell in the first cell identity.

For the resource status update process, in the prior art, the first base station notifies the second base station of an ECGI of the first cell. In this embodiment of the present invention, the first base station adds indication information to a resource status update message and sends the resource status update message to the second base station. The indication information is used to indicate the location of the part used to identify the first base station in the first cell identity or is used to indicate the location of the part used to identify the first cell in the first cell identity.

For the mobility change request process, in the prior art, the first base station notifies the second base station of an ECGI of the first cell and an ECGI of the second cell (where the second cell belongs to the second base station). In this embodiment of the present invention, the first base station adds indication information to a mobility change request message and sends the mobility change request message to the second base station. The indication information is used to indicate the location of the part used to identify the first base station in the first cell identity or the location of the part used to identify the first cell in the first cell identity, and is used to indicate a location of the part used to identify the second base station in the second cell identity or a location of the part used to identify the second cell in the second cell identity.

For the mobility change acknowledgement process, in the prior art, the first base station notifies the second base station of an ECGI of the first cell and an ECGI of the second cell (where the second cell belongs to the second base station). In this embodiment of the present invention, the first base station adds indication information to a mobility change acknowledgement message and sends the mobility change acknowledgement message to the second base station. The indication information is used to indicate the location of the part used to identify the first base station in the first cell identity or the location of the part used to identify the first cell in the first cell identity, and is used to indicate a location of the part used to identify the second base station in the second cell identity or a location of the part used to identify the second cell in the second cell identity.

For the mobility change failure process, in the prior art, the first base station notifies the second base station of an ECGI of the first cell and an ECGI of the second cell (where the second cell belongs to the second base station). In this embodiment of the present invention, the first base station adds indication information to a mobility change failure message and sends the mobility change failure message to the second base station. The indication information is used to indicate the location of the part used to identify the first base station in the first cell identity or the location of the part used to identify the first cell in the first cell identity, and is used to indicate a location of the part used to identify the second base station in the second cell identity or a location of the part used to identify the second cell in the second cell identity.

For the RLF indication process, in the prior art, the first base station notifies the second base station of an ECGI of the first cell. In this embodiment of the present invention, the first base station adds indication information to an RLF indication message and sends the RLF indication message to the second base station. The indication information is used to indicate the location of the part used to identify the first base station in the first cell identity or is used to indicate the location of the part used to identify the first cell in the first cell identity.

For the handover report process, in the prior art, the first base station notifies the second base station of an ECGI of the first cell and an ECGI of the second cell (where the second cell belongs to the second base station). In this embodiment of the present invention, the first base station adds indication information to a handover report message and sends the handover report message to the second base station. The indication information is used to indicate the location of the part used to identify the first base station in the first cell identity or the location of the part used to identify the first cell in the first cell identity, and is used to indicate a location of the part used to identify the second base station in the second cell identity or a location of the part used to identify the second cell in the second cell identity.

For the cell activation request process, in the prior art, the first base station notifies the second base station of an ECGI of the second cell (where the second cell belongs to the second base station). In this embodiment of the present invention, the first base station adds indication information to a cell activation request message and sends the cell activation request message to the second base station. The indication information is used to indicate a location of the part used to identify the second base station in the second cell identity or is used to indicate a location of the part used to identify the second cell in the second cell identity.

For the cell activation response process, in the prior art, the first base station notifies the second base station of an ECGI of the first cell. In this embodiment of the present invention, the first base station adds indication information to a cell activation response message and sends the cell activation response message to the second base station. The indication information is used to indicate the location of the part used to identify the first base station in the first cell identity or is used to indicate the location of the part used to identify the first cell in the first cell identity.

In the X2 interface protocol procedures included in the present invention, for an IE that needs to be obtained by specifying or updating an original IE during interaction, refer to an IE related to a cell identity, an eNB ID, or a cell ID in 9.2.8, 9.2.14, 9.2.21, 9.2.22, 9.2.40, 9.2.56, 9.2.68, 9.2.75, 9.2.76, 9.1.2.3, 9.1.2.4, 9.1.2.23, 9.1.2.25, 9.1.2.26, 9.1.1.1, 9.1.2.24, 9.1.2.1, 9.1.2.8, 9.1.2.11, 9.1.2.12, 9.1.2.13, 9.1.2.14, 9.1.2.15, 9.1.2.16, 9.1.2.17, 9.1.2.18, 9.1.2.19, 9.1.2.20, and 9.1.2.21 in the TS36.423.

Optionally, in the foregoing embodiment, the cell identity includes 28 bits, the first identifier field includes 20 bits, the second identifier field includes 8 bits, the reserved bit in the first identifier field includes X bits, where $1 \leq X < 20$ and X is an integer, and the reserved bit in the second identifier field includes Y bits, where $1 \leq Y < 8$ and Y is an integer.

Figure 5:
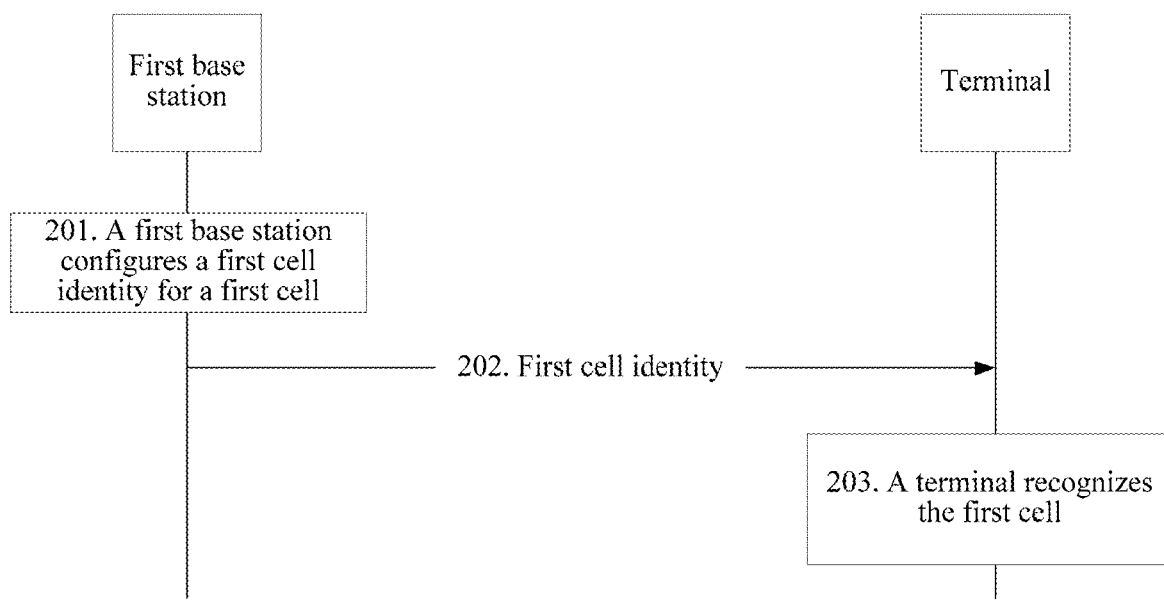
FIG. 5 is a second method flowchart of Embodiment 1 of a notification method according to the present invention.

FIG. 5 is a second method flowchart of Embodiment 1 of a notification method according to the present invention. In this embodiment, a first base station interacts with a terminal. This is applicable to a scenario in which the first base station needs to flexibly configure a cell identity of a cell and notify the terminal of the cell identity in a process of communicating with the terminal. Specifically, this embodiment includes the following steps.

201: The first base station configures a first cell identity for a first cell. The first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell. The first cell belongs to the first base station.

Specifically, refer to step 101 in FIG. 3, and details are not described herein again.

202: The first base station notifies the terminal of the first cell identity.

After configuring the first cell identity for the first cell, the first base station notifies the terminal of the first cell identity.

Specifically, the first base station sends an evolved cell global identifier ECGI of the first cell to the terminal. The ECGI includes a public land mobile network identity and the first cell identity.

203: The terminal recognizes the first cell.

Specifically, the terminal parses the ECGI to obtain the first cell identity, and further recognizes the first cell based on the first cell identity.

According to the notification method provided in this embodiment of the present invention, when the first cell identity is configured for the first cell belonging to the first base station, and when a total length of the cell identity remains unchanged, the cell identity is flexibly configured through bit borrowing. In this process, a limitation in the prior art that 20 high-order bits in a 28-bit cell identity are used to identify eNBs and 8 low-order bits are used to identify cells is broken, and the cell identity is flexibly configured through bit borrowing, so that a part used to identify eNBs in the cell identity is not limited to 20 high-order bits and a part used to identify cells is not limited to 8 low-order bits. In this way, when more than 20 bits in a 28-bit cell identity are used to identify eNBs, a quantity of eNBs that can be identified by the cell identity exceeds a limitation of 1.04 million in the prior art, and the quantity of eNBs that can be identified by the cell identity is greatly increased, so that the cell identity meets a communication requirement. Similarly, when more than 8 bits in a 28-bit cell identity are used to identify cells, a quantity of cells that can be identified by the cell identity exceeds a limitation of 256 in the prior art, and the quantity of cells that can be identified by the cell identity is greatly increased, so that the cell identity meets a communication requirement. In addition, in this process, when a quantity of cells supported by an eNB is less than 256, less than 8 bits in the 28-bit cell identity are used to identify the cells, so as to reduce signaling waste.

Optionally, in the foregoing embodiment, the first base station further notifies a second base station or a core network device of a part used to identify the first cell in the first cell identity or a part used to identify the first base station in the first cell identity.

Specifically, in a notification process, the first base station sends the first cell identity to the second base station or the core network device. The first base station sends first indication information to the second base station or the core network device. The first indication information is used to indicate a location of the part used to identify the first base station in the first cell identity or is used to indicate a location of the part used to identify the first cell in the first cell identity. Alternatively, the first base station sends an identifier of the first base station to the second base station or the core network device. For detailed descriptions, refer to the descriptions of 102 in the embodiment in FIG. 3, and details are not described herein again.

Optionally, in the foregoing embodiment, the first base station further obtains a second cell identity of a second cell. The second cell identity includes a third identifier field and a fourth identifier field, and a reserved bit in the third identifier field and the fourth identifier field are used to identify the second cell and a remaining bit in the third identifier field is used to identify the second base station, or a reserved bit in the fourth identifier field and the third identifier field are used to identify the second base station and a remaining bit in the fourth identifier field is used to identify the second cell.

The first base station notifies the second base station or the core network device of a part used to identify the second cell in the second cell identity or a part used to identify the second base station in the second cell identity. The second cell belongs to the second base station.

Embodiment 2

In the foregoing Embodiment 1, when the total length of the cell identity remains unchanged, the cell identity is flexibly configured through bit borrowing. However, the present invention is not limited thereto. In another feasible implementation, the total length of the cell identity may not remain unchanged, in other words, the length of the cell identity is extended, so as to flexibly configure the cell identity.

First, a first base station flexibly configures a cell identity and notifies a second base station or a core network device of the cell identity.

Figure 6A:
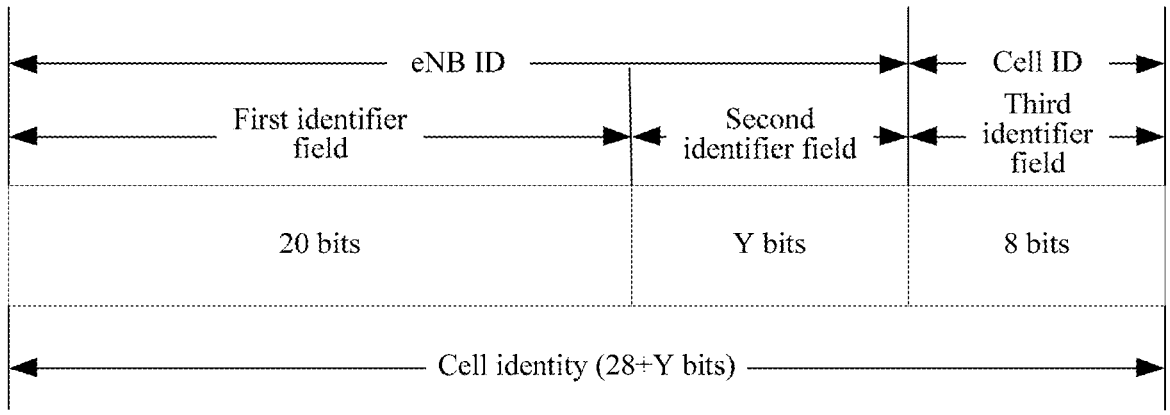
FIG. 6A is a schematic diagram of a cell identity in Embodiment 2 of a notification method according to the present invention.
Figure 6B:
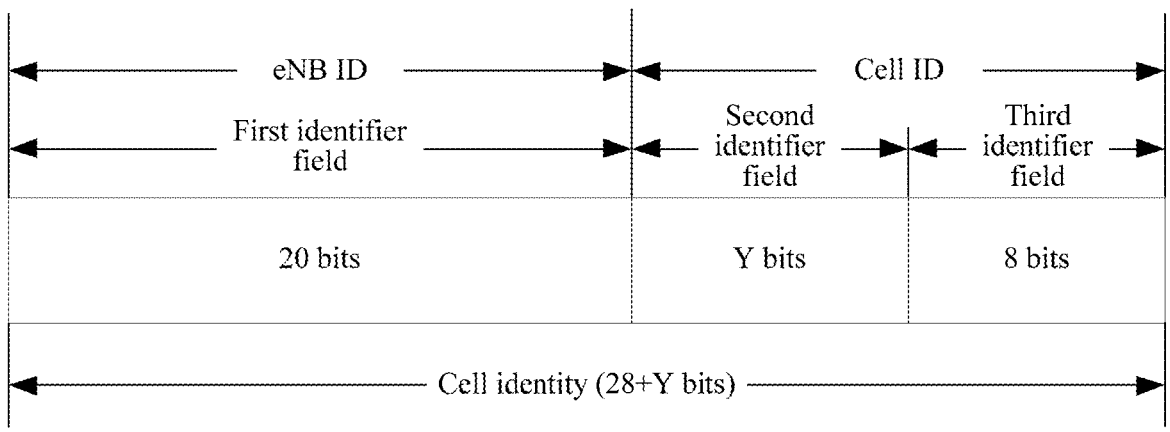
FIG. 6B is a schematic diagram of another cell identity in Embodiment 2 of the notification method according to the present invention.
Figure 6C:
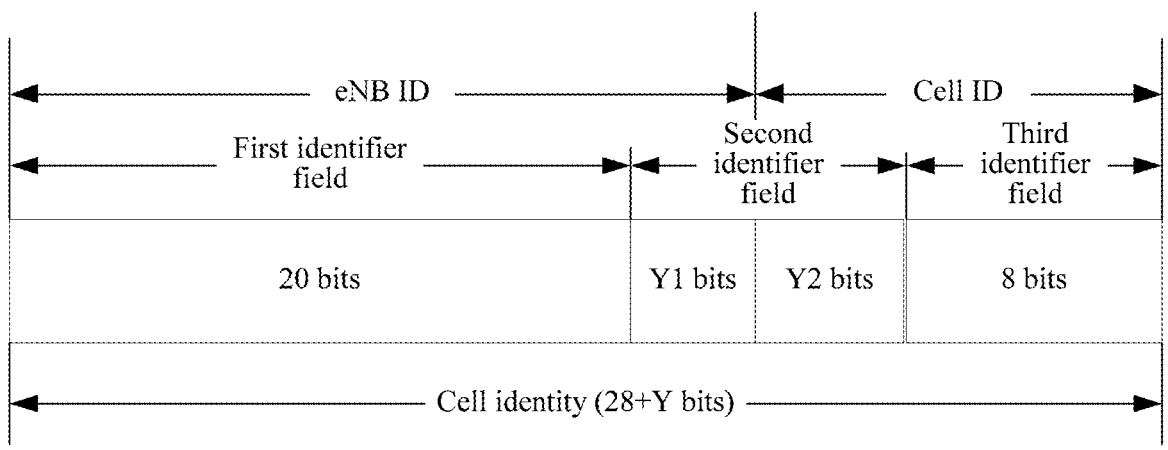
FIG. 6C is a schematic diagram of still another cell identity in Embodiment 2 of the notification method according to the present invention.

Specifically, the first base station configures a cell identity for a first cell. The cell identity includes a first identifier field, a second identifier field, and a third identifier field. The first identifier field and the second identifier field are used to identify the first base station, and the third identifier field is used to identify the first cell; or the first identifier field is used to identify the first base station, and the second identifier field and the third identifier field are used to identify the first cell. Referring to FIG. 6A, FIG. 6B, and FIG. 6C, this embodiment of the present invention is described below in detail by using an example in which a length of a cell identity before extension is 28 bits, and a length of a cell identity obtained after extension is 28+Y bits, in other words, the cell identity is extended by Y bits.

FIG. 6A is a schematic diagram of a cell identity in Embodiment 2 of a notification method according to the present invention. Referring to FIG. 6A, when the first identifier field includes 20 bits, the second identifier field includes Y bits, and the third identifier field includes 8 bits, the first identifier field and the second identifier field may be used to identify the first base station. In other words, in the cell identity, 20+Y bits are used to identify the first base station, and 8 bits are used to identify the first cell.

FIG. 6B is a schematic diagram of another cell identity in Embodiment 2 of the notification method according to the present invention. Referring to FIG. 6B, when the first identifier field includes 20 bits, the second identifier field includes Y bits, and the third identifier field includes 8 bits, the second identifier field and the third identifier field may be used to identify the first cell. In other words, in the cell identity, 20 bits are used to identify the first base station, and Y+8 bits are used to identify the first cell.

FIG. 6C is a schematic diagram of still another cell identity in Embodiment 2 of the notification method according to the present invention. Referring to FIG. 6C, when the first identifier field includes 20 bits, the second identifier field includes Y bits, and the third identifier field includes 8 bits, the second identifier field may be divided into two parts, a length of a first part is Y1, and a length of a second part is Y2. Y1 and Y2 are positive integers, and Y1+Y2=Y. In this case, the first identifier field and the first part are used to identify the first base station. In other words, in the cell identity, 20+Y1 bits are used to identify the first base station, and Y2+8 bits are used to identify the first cell.

After configuring the cell identity for the first cell, the first base station notifies the second base station or the core network device of a part used to identify the first cell in the cell identity or a part used to identify the first base station in the cell identity. Specifically, in a sending process, the first base station may send first indication information to the second base station or the core network device. The first indication information is used to indicate a location of a part used to identify the first base station in an extended cell identity, or is used to indicate a location of a part used to identify the first cell in the cell identity. Alternatively, the first base station may send second indication information to the second base station or the core network device. The second indication information is used to indicate the second identifier field, in other words, a location of an extended identifier field. In addition, sending may be performed in another manner, and the present invention is not limited thereto.

According to the notification method provided in this embodiment of the present invention, when the cell identity is configured for the first cell belonging to the first base station, the length of the cell identity is extended, so that an eNB ID and a cell ID included in the cell identity are flexibly configured. In this process, a limitation in the prior art that the total length of the cell identity is 28 bits is broken, in other words, the cell identity is extended to 28+Y bits. In this way, when more than 20 bits in the 28+Y bits are used to identify eNBs, a quantity of eNBs that can be identified by the cell identity exceeds a limitation of 1.04 million in the prior art, and the quantity of eNBs that can be identified by the cell identity is greatly increased, so that the cell identity meets a communication requirement. Similarly, when more than 8 bits in the (28+Y)-bit cell identity are used to identify cells, a quantity of cells that can be identified by the cell identity exceeds a limitation of 256 in the prior art, and the quantity of cells that can be identified by the cell identity is greatly increased, so that the cell identity meets a communication requirement.

Optionally, in the foregoing information sending process, the total length of the cell identity is changed, causing impact on an air interface. Therefore, related protocols such as an X2 interface protocol, an S1 interface protocol, and a Uu interface protocol need to be modified, so that a communication-related process is supported by UE and the like.

Optionally, in the foregoing embodiment, the first base station notifies the second base station or the core network device of at least one of a cell identity of a second cell and a part used to identify the second base station in the cell identity of the second cell, and the second cell belongs to the second base station.

Next, the first base station flexibly configures the cell identity and notifies a terminal of the cell identity.

In this process, the first base station configures the cell identity for the first cell. The cell identity includes the first identifier field, the second identifier field, and the third identifier field. The first identifier field and the second identifier field are used to identify the first base station, and the third identifier field is used to identify the first cell; or the first identifier field is used to identify the first base station, and the second identifier field and the third identifier field are used to identify the first cell. Specifically, refer to the foregoing descriptions that the first base station flexibly configures the cell identity and notifies the second base station or the core network device of the cell identity, and details are not described herein again.

After configuring the cell identity for the first cell, the first base station notifies the terminal of the cell identity. Specifically, the first base station sends an evolved cell global identifier ECGI of the first cell to the terminal. The ECGI includes a public land mobile network identity and the cell identity.

Embodiment 3

Compared with the foregoing Embodiment 1 in which the cell identity is flexibly configured through bit borrowing when the total length of the cell identity remains unchanged, and compared with the foregoing Embodiment 2 in which the length of the cell identity is extended, so as to flexibly configure the cell identity, in this embodiment, at least two different eNB IDs are configured for a same base station, so that a quantity of eNBs that can be identified by a cell identity is not limited.

Specifically, a first base station configures base station identifiers used to identify the first base station. There are at least two base station identifiers, and the base station identifiers are different from each other. Then, the first base station sends first information to a second base station or a core network device. The first information is used to indicate that at least two of the base station identifiers are used to identify the first base station.

In this step embodiment, the first base station configures a plurality of base station identifiers. For example, when a cell identity includes 28 bits, and an eNB ID includes 20 bits, it may be learned based on an existing protocol that 2^20=1048576≈1.04 million base stations may be identified. In this step, the first base station configures at least two of the plurality of identifiers as the base station identifiers of the first base station. After the first base station configures the at least two base station identifiers for the first base station, the first base station sends the first information to the second base station or the core network device, to indicate that the at least two base station identifiers are identifiers of the first base station. That is, the first base station has at least two different base station identifiers. In this way, a maximum quantity of cells served by the first base station may exceed 256. For example, when the first base station uses three eNB IDs, the maximum quantity of cells served by the first base station may reach 768.

According to the notification method provided in this embodiment of the present invention, the first base station configures the at least two base station identifiers for the first base station. Then, the first base station sends a first message to the second base station or the core network device. The first message indicates the at least two base station identifiers used to identify the first base station. In this process, at least two different base station identifiers are configured for a same base station, so that a maximum quantity of cells served by a same base station is increased, and further a cell identity meets a communication requirement.

In the foregoing notification method, when the first base station uses a plurality of base station identifiers (for example, three different base station identifiers), in terms of logic, a base station identified by different base station identifiers is equivalent to a plurality of different base stations. In this case, when the first base station needs to set up an X2 interface to the second base station or needs to set up an S1 interface to an MME, setup needs to be performed for a plurality of times, leading to large signaling overheads. However, essentially, physical base stations corresponding to the plurality of different base station identifiers are all the first base station. Therefore, in a process of setting up the X2 interface, setup needs to be performed only once. Similarly, in a process of setting up the S1 interface, setup also needs to be performed only once. In this embodiment of the present invention, the following solution may be used to avoid waste of signaling overheads caused when a same base station uses a plurality of base station identifiers.

Specifically, to avoid a plurality of times of X2 interface setup, an X2 setup request may be used as the first message, the information indicating that the at least two base station identifiers are base station identifiers of the first base station is added to the first message and the first message is sent to the second base station, and the second base station is, for example, a base station that needs to set up an X2 interface to the first base station, to indicate to the second base station that base stations corresponding to the at least two base station identifiers are essentially a same base station, and the X2 interface needs to be set up only once. Similarly, to avoid a plurality of times of S1 interface setup, an S1 setup request may be used as the first message, and information indicating that the at least two base station identifiers are base station identifiers of the first base station is carried in the first message and the first message is sent to the MME, to indicate to the MME that base stations corresponding to the at least two base station identifiers are essentially a same base station, and the S1 interface needs to be set up only once.

The foregoing describes a manner of avoiding impact on the S1 interface setup and the X2 interface setup when the at least two different eNB IDs are configured for the first base station. However, in addition to the impact on the S1 interface setup and the X2 interface setup, cell handover is further affected when the at least two different eNB IDs are configured for the first base station. Specifically, when a terminal is handed over between two cells served by the first base station, for example, when the terminal moves from a first cell served by the first base station to a second cell served by the first base station, the handover is essentially cell handover within the first base station. However, in this embodiment of the present invention, the first base station has the at least two different eNB IDs, and consequently, an eNB ID in a cell identity of the first cell may be different from an eNB ID in a cell identity of the second cell. Therefore, in terms of logic, the cell handover is essentially inter-base station handover. Generally, when inter-base station cell handover is performed, a path switch process needs to be performed between a base station and a core network device, leading to unnecessary waste of signaling overheads. In this embodiment of the present invention, for the first base station having the at least two eNB IDs, base stations corresponding to the eNB IDs use a same eNB IP address, and a domain name system (DNS) needs to maintain only one domain name. To avoid waste of signaling overheads, when handover between two logical base stations is X2-interface-based handover, a handover request message is used as the first message, and the information indicating that at least two of a plurality of base station identifiers are base station identifiers of the first base station is added to the first message, to notify a target base station that a source base station and the target base station correspond to a same physical base station, and there is no need to perform a path switch process between the target base station and a core network. When handover between two logical base stations is S1-interface-based handover, a handover request message is used as the first message, and the information indicating that at least two of a plurality of base station identifiers are base station identifiers of the first base station is added to the first message, to notify the MME that a target base station to which a terminal is to be handed over and a source base station are essentially a same physical base station, and there is no need to perform a path switch process between the target base station and a core network.

Figure 7:
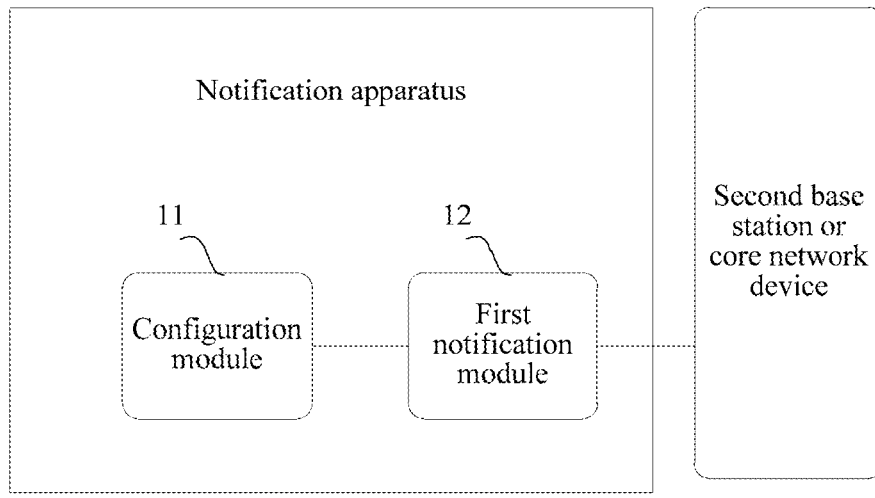
FIG. 7 is a schematic structural diagram of Embodiment 1 of a notification apparatus according to the present invention.

FIG. 7 is a schematic structural diagram of Embodiment 1 of a notification apparatus according to the present invention. The apparatus described in this embodiment is disposed on a first base station, and the apparatus includes:

a configuration module 11, adapted to configure a first cell identity for a first cell, where the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell; and a first notification module 12, adapted to notify a second base station or a core network device of a part used to identify the first cell in the first cell identity configured by the configuration module 11 or a part used to identify the first base station in the first cell identity.

According to the notification apparatus provided in this embodiment of the present invention, when the first cell identity is configured for the first cell belonging to the first base station, when a total length of the cell identity remains unchanged, the cell identity is flexibly configured through bit borrowing. In this process, a limitation in the prior art that 20 high-order bits in a 28-bit cell identity are used to identify eNBs and 8 low-order bits are used to identify cells is broken, and the cell identity is flexibly configured through bit borrowing, so that a part used to identify eNBs in the cell identity is not limited to 20 high-order bits and a part used to identify cells is not limited to 8 low-order bits. In this way, when more than 20 bits in a 28-bit cell identity are used to identify eNBs, a quantity of eNBs that can be identified by the cell identity exceeds a limitation of 1.04 million in the prior art, and the quantity of eNBs that can be identified by the cell identity is greatly increased, so that the cell identity meets a communication requirement. Similarly, when more than 8 bits in a 28-bit cell identity are used to identify cells, a quantity of cells that can be identified by the cell identity exceeds a limitation of 256 in the prior art, and the quantity of cells that can be identified by the cell identity is greatly increased, so that the cell identity meets a communication requirement. In addition, in this process, when a quantity of cells supported by an eNB is less than 256, less than 8 bits in the 28-bit cell identity are used to identify the cells, so as to reduce signaling waste.

Optionally, in an embodiment of the present invention, the first notification module 12 is specifically adapted to: send the first cell identity to the second base station or the core network device; and send first indication information to the second base station or the core network device. The first indication information is used to indicate a location of the part used to identify the first base station in the first cell identity or is used to indicate a location of the part used to identify the first cell in the first cell identity.

Optionally, in an embodiment of the present invention, the first notification module 12 is specifically adapted to send an identifier of the first base station to the second base station or the core network device.

Figure 8:
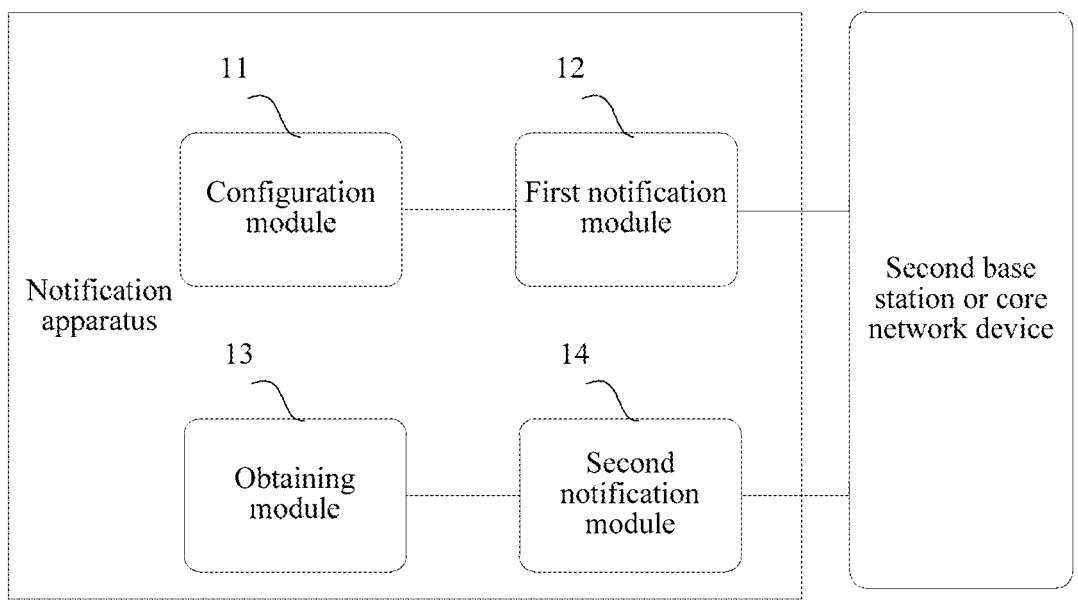
FIG. 8 is a schematic structural diagram of Embodiment 2 of a notification apparatus according to the present invention.

FIG. 8 is a schematic structural diagram of Embodiment 2 of a notification apparatus according to the present invention. Based on the embodiment shown in FIG. 7, the notification apparatus described in this embodiment further includes:

an obtaining module 13, adapted to obtain a second cell identity of a second cell, where the second cell identity includes a third identifier field and a fourth identifier field, and a reserved bit in the third identifier field and the fourth identifier field are used to identify the second cell and a remaining bit in the third identifier field is used to identify the second base station, or a reserved bit in the fourth identifier field and the third identifier field are used to identify the second base station and a remaining bit in the fourth identifier field is used to identify the second cell; and a second notification module 14, adapted to notify the second base station or the core network device of a part used to identify the second cell in the second cell identity obtained by the obtaining module 13 or a part used to identify the second base station in the second cell identity, where the second cell belongs to the second base station.

Optionally, in an embodiment of the present invention, the first cell identity includes 28 bits, the first identifier field includes 20 bits, the second identifier field includes 8 bits, the reserved bit in the first identifier field includes X bits, where 1≤X<20 and X is an integer, and the reserved bit in the second identifier field includes Y bits, where 1≤Y<8 and Y is an integer.

Figure 9:
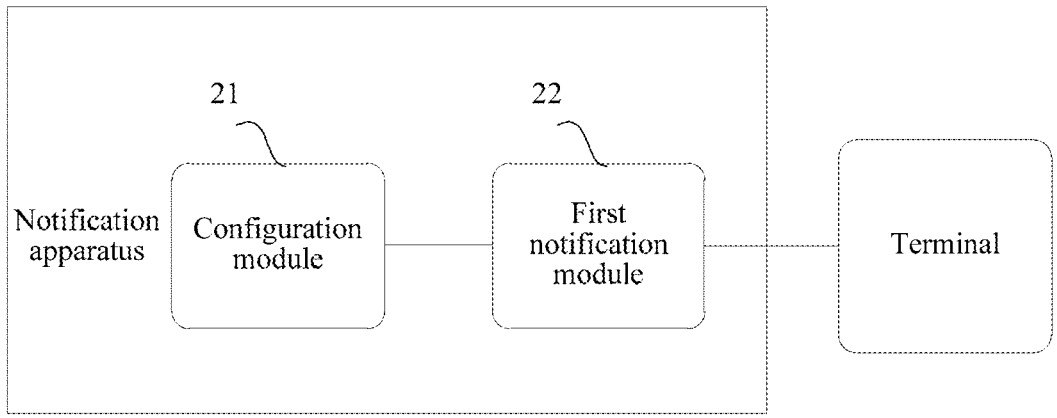
FIG. 9 is a schematic structural diagram of Embodiment 3 of a notification apparatus according to the present invention.

FIG. 9 is a schematic structural diagram of Embodiment 3 of a notification apparatus according to the present invention. The notification apparatus provided in this embodiment includes:

a configuration module 21, adapted to configure a first cell identity for a first cell, where the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell, where the first cell belongs to the first base station; and a first notification module 22, adapted to notify a terminal of the first cell identity configured by the configuration module 21.

According to the notification apparatus provided in this embodiment of the present invention, when the first cell identity is configured for the first cell belonging to the first base station, and when a total length of the cell identity remains unchanged, the cell identity is flexibly configured through bit borrowing. In this process, a limitation in the prior art that 20 high-order bits in a 28-bit cell identity are used to identify eNBs and 8 low-order bits are used to identify cells is broken, and the cell identity is flexibly configured through bit borrowing, so that a part used to identify eNBs in the cell identity is not limited to 20 high-order bits and a part used to identify cells is not limited to 8 low-order bits. In this way, when more than 20 bits in a 28-bit cell identity are used to identify eNBs, a quantity of eNBs that can be identified by the cell identity exceeds a limitation of 1.04 million in the prior art, and the quantity of eNBs that can be identified by the cell identity is greatly increased, so that the cell identity meets a communication requirement. Similarly, when more than 8 bits in a 28-bit cell identity are used to identify cells, a quantity of cells that can be identified by the cell identity exceeds a limitation of 256 in the prior art, and the quantity of cells that can be identified by the cell identity is greatly increased, so that the cell identity meets a communication requirement. In addition, in this process, when a quantity of cells supported by an eNB is less than 256, less than 8 bits in the 28-bit cell identity are used to identify the cells, so as to reduce signaling waste.

Figure 10:
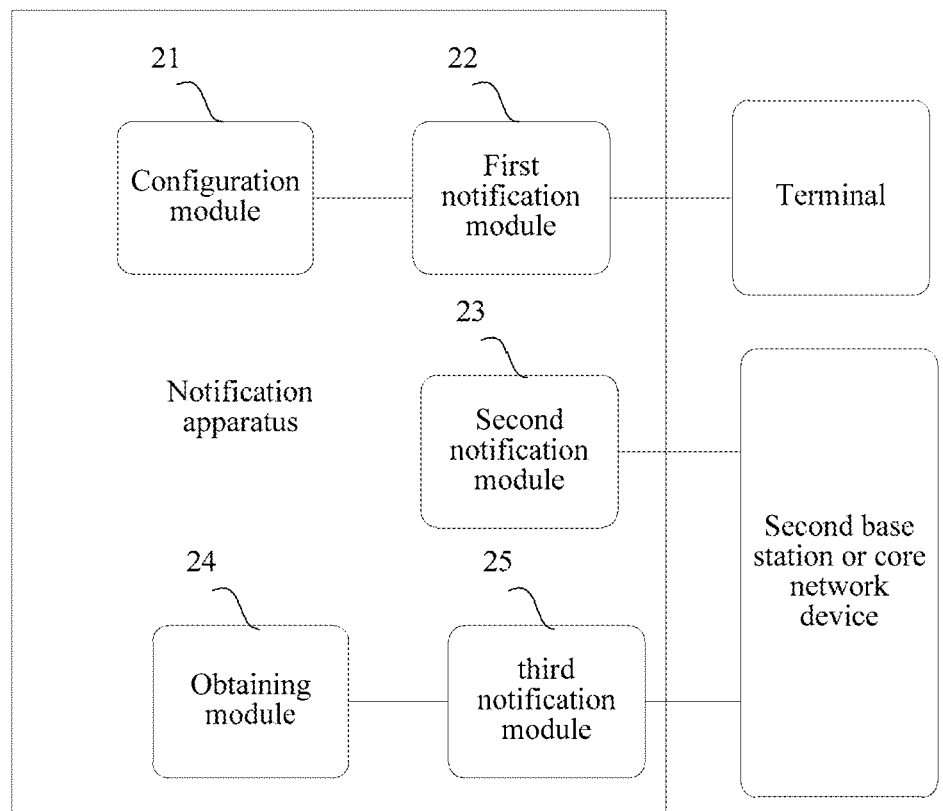
FIG. 10 is a schematic structural diagram of Embodiment 4 of a notification apparatus according to the present invention.

FIG. 10 is a schematic structural diagram of Embodiment 4 of a notification apparatus according to the present invention. Based on FIG. 9, the notification apparatus provided in this embodiment further includes:

a second notification module 23, adapted to notify a second base station or a core network device of a part used to identify the first cell in the first cell identity or a part used to identify the first base station in the first cell identity.

Optionally, in an embodiment of the present invention, the first notification module 22 is specifically adapted to: send the first cell identity to the second base station or the core network device; and send first indication information to the second base station or the core network device. The first indication information is used to indicate a location of the part used to identify the first base station in the first cell identity or is used to indicate a location of the part used to identify the first cell in the first cell identity.

Optionally, in an embodiment of the present invention, the first notification module 22 is specifically adapted to send an identifier of the first base station to the second base station or the core network device.

Referring to FIG. 10 again, in an embodiment of the present invention, the apparatus further includes:

an obtaining module 24, adapted to obtain a second cell identity of a second cell, where the second cell identity includes a third identifier field and a fourth identifier field, and a reserved bit in the third identifier field and the fourth identifier field are used to identify the second cell and a remaining bit in the third identifier field is used to identify the second base station, or a reserved bit in the fourth identifier field and the third identifier field are used to identify the second base station and a remaining bit in the fourth identifier field is used to identify the second cell; and a third notification module 25, adapted to notify the second base station or the core network device of a part used to identify the second cell in the second cell identity or a part used to identify the second base station in the second cell identity, where the second cell belongs to the second base station.

Figure 11:
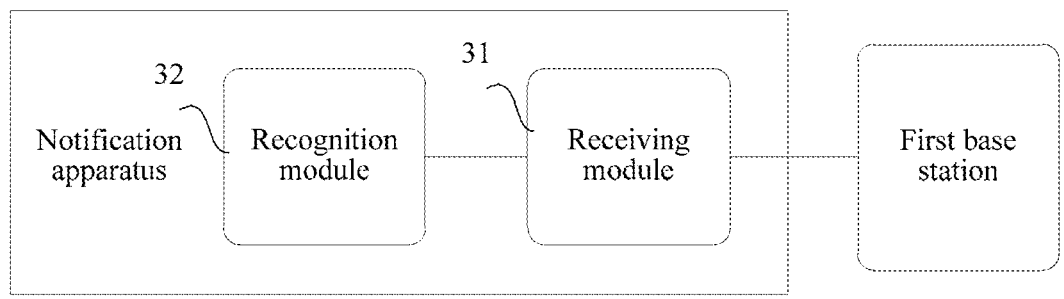
FIG. 11 is a schematic structural diagram of Embodiment 5 of a notification apparatus according to the present invention.

FIG. 11 is a schematic structural diagram of Embodiment 5 of a notification apparatus according to the present invention. The apparatus described in this embodiment is disposed on a terminal, and the apparatus includes:

a receiving module 31, adapted to receive an evolved cell global identifier ECGI that is of a first cell and that is notified by a first base station, where the ECGI includes a public land mobile network identity and a cell identity, the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell, where the first cell belongs to the first base station; and a recognition module 32, adapted to recognize the first cell based on the ECGI received by the receiving module 31.

Figure 12:
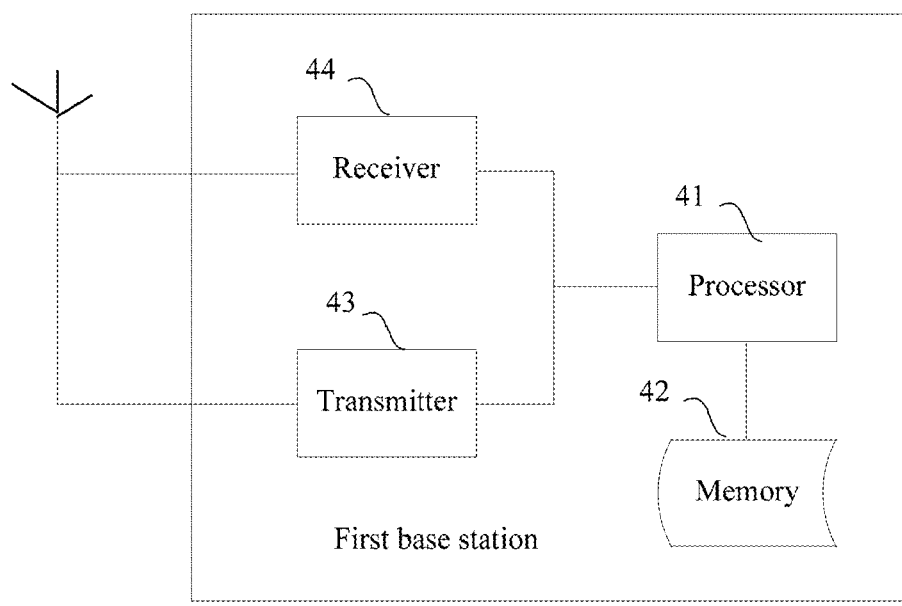
FIG. 12 is a schematic structural diagram of Embodiment 1 of a base station according to the present invention.

FIG. 12 is a schematic structural diagram of Embodiment 1 of a base station according to the present invention. As shown in FIG. 12, the base station provided in this embodiment of the present invention is specifically a first base station. The first base station includes a processor 41 and a memory 42. The first base station 400 may further include a transmitter 43 and a receiver 44. The transmitter 43 and the receiver 44 may be connected to the processor 41. The memory 42 stores an executable instruction. When the first base station 400 runs, the processor 41 communicates with the memory 42. The processor 41 invokes the executable instruction in the memory 42 to: configure a first cell identity for a first cell, where the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell; and notify a second base station or a core network device of a part used to identify the first cell in the first cell identity or a part used to identify the first base station in the first cell identity.

Optionally, the processor is specifically adapted to: send the first cell identity to the second base station or the core network device; and send first indication information to the second base station or the core network device. The first indication information is used to indicate a location of the part used to identify the first base station in the first cell identity or is used to indicate a location of the part used to identify the first cell in the first cell identity.

Optionally, the processor is specifically adapted to send an identifier of the first base station to the second base station or the core network device.

Optionally, the processor is further adapted to: obtain a second cell identity of a second cell, where the second cell identity includes a third identifier field and a fourth identifier field, and a reserved bit in the third identifier field and the fourth identifier field are used to identify the second cell and a remaining bit in the third identifier field is used to identify the second base station, or a reserved bit in the fourth identifier field and the third identifier field are used to identify the second base station and a remaining bit in the fourth identifier field is used to identify the second cell; and notify the second base station or the core network device of a part used to identify the second cell in the second cell identity or a part used to identify the second base station in the second cell identity, where the second cell belongs to the second base station.

Figure 13:
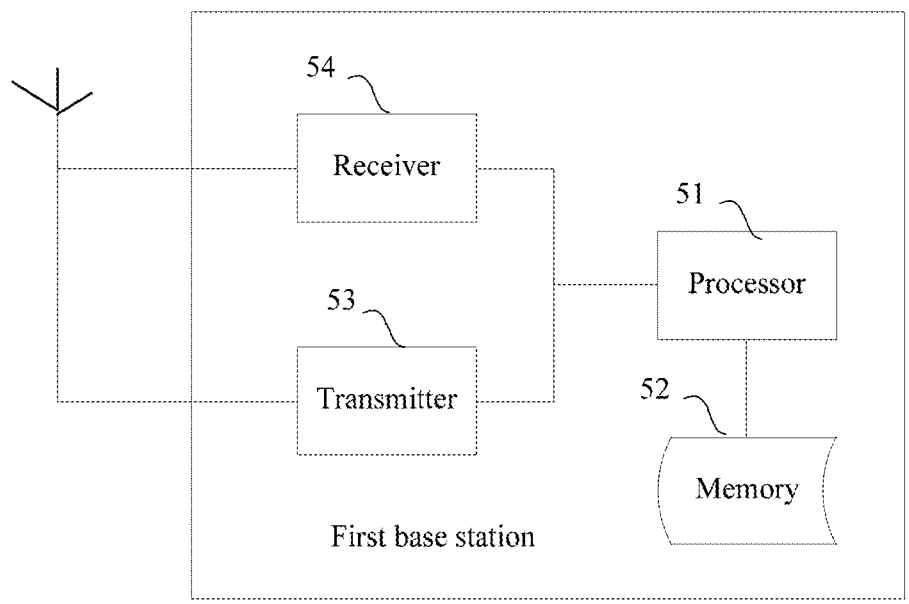
FIG. 13 is a schematic structural diagram of Embodiment 2 of a base station according to the present invention.

FIG. 13 is a schematic structural diagram of Embodiment 2 of a base station according to the present invention. As shown in FIG. 13, the base station provided in this embodiment of the present invention is specifically a first base station. The first base station includes a processor 51 and a memory 52. The first base station may further include a transmitter 53 and a receiver 54. The transmitter 53 and the receiver 54 may be connected to the processor 51. The memory 52 stores an executable instruction. When the first base station runs, the processor 51 communicates with the memory 52. The processor 51 invokes the executable instruction in the memory 52 to: configure a first cell identity for a first cell, where the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell, where the first cell belongs to the first base station; and notify a terminal of the first cell identity.

Optionally, the processor is further adapted to notify a second base station or a core network device of a part used to identify the first cell in the first cell identity or a part used to identify the first base station in the first cell identity.

Optionally, the processor is specifically adapted to: send the first cell identity to the second base station or the core network device; and send first indication information to the second base station or the core network device. The first indication information is used to indicate a location of the part used to identify the first base station in the first cell identity or is used to indicate a location of the part used to identify the first cell in the first cell identity.

Optionally, the processor is specifically adapted to send an identifier of the first base station to the second base station or the core network device.

Optionally, the processor is further adapted to: obtain a second cell identity of a second cell, where the second cell identity includes a third identifier field and a fourth identifier field, and a reserved bit in the third identifier field and the fourth identifier field are used to identify the second cell and a remaining bit in the third identifier field is used to identify the second base station, or a reserved bit in the fourth identifier field and the third identifier field are used to identify the second base station and a remaining bit in the fourth identifier field is used to identify the second cell; and notify the second base station or the core network device of a part used to identify the second cell in the second cell identity or a part used to identify the second base station in the second cell identity, where the second cell belongs to the second base station.

Figure 14:
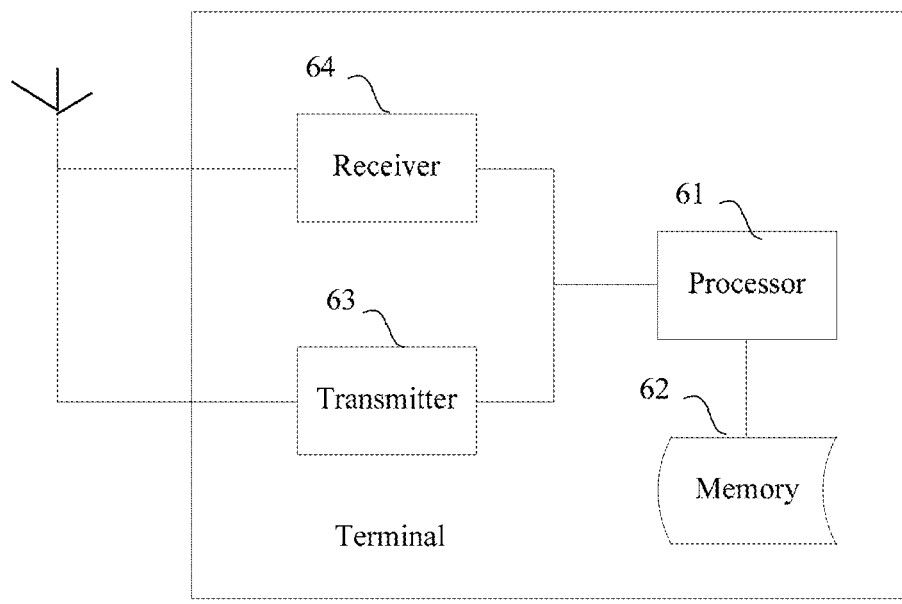
FIG. 14 is a schematic structural diagram of an embodiment of a terminal according to the present invention.

FIG. 14 is a schematic structural diagram of an embodiment of a terminal according to the present invention. As shown in FIG. 14, the terminal provided in this embodiment of the present invention includes a processor 61 and a memory 62. The terminal may further include a transmitter 63 and a receiver 64. The transmitter 63 and the receiver 64 may be connected to the processor 61. The memory 62 stores an executable instruction. When the terminal runs, the processor 61 communicates with the memory 62. The processor 61 invokes the executable instruction in the memory 62 to: receive an evolved cell global identifier ECGI that is of a first cell and that is notified by a first base station, where the ECGI includes a public land mobile network identity and a cell identity, the first cell identity includes a first identifier field and a second identifier field, and a reserved bit in the first identifier field and the second identifier field are used to identify the first cell and a remaining bit in the first identifier field is used to identify the first base station, or a reserved bit in the second identifier field and the first identifier field are used to identify the first base station and a remaining bit in the second identifier field is used to identify the first cell, where the first cell belongs to the first base station; and recognize the first cell based on the ECGI.

Persons of ordinary skill in the art may understand that all or some of the steps in the method embodiments may be implemented by a program instructing relevant hardware. The program may be stored in a computer-readable storage medium. When the program runs, the steps in the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A notification method, comprising:
   configuring, by a first base station, a first cell identity for a first cell, wherein the first cell identity comprises a first identifier field and a second identifier field, wherein the first identifier field comprises one or more high-order bits of the first cell identity and the second identifier field comprises one or more low-order bits of the first cell identity;
   configuring a notification information for notifying a reserved bit location information, wherein the notification information containing the reserved bit location information is used to identify the first base station and the first cell in the first cell identity, and wherein the reserved bit location information comprises an X number of reserved bits and a bit order position information, and wherein identifying the first base station and the first cell in the first cell identity based on the reserved bit location information comprises:
   in response to the bit order position information being set to a high-order bit position, determining that all bits in the first identifier fields and the X number of reserved bits of a high-order bits of the second identifier field identify the first base station, and that a remaining bits other than the X number of reserved bits of the high-order bits of the second identifier field identify the first cell; and
   in response to the bit order position information being set to a low-order bit position, determining that all bits in the second identifier field and the X number of reserved bits of a low-order bits of the first identifier field identify the first cell, and that a remaining bits other than the X number of reserved bits of the low-order bits of the first identifier field identify the first base station; and
   notifying, by the first base station, a second base station or a core network device of a part of the first cell identity that identifies the first base station.

2. The method according to claim 1, wherein the notifying, by the first base station, a second base station or a core network device of a part of the first cell identity that identifies the first base station comprises:
   sending, by the first base station, the first cell identity to the second base station or the core network device; and
   sending, by the first base station, first indication information to the second base station or the core network device, wherein the first indication information indicates a location of the part of the first cell identity that identifies the first base station in the first cell identity.

3. The method according to claim 1, wherein the notifying, by the first base station, a second base station or a core network device of a part of the first cell identity that identifies the first base station comprises:
   sending, by the first base station, an identifier of the first base station to the second base station or the core network device.

4. The method according to claim 1, wherein the first cell identity comprises 28 bits, wherein the first identifier field comprises 20 bits, wherein the second identifier field comprises 8 bits, wherein one or more second reserved bits in the second identifier field comprise Y bits, and wherein 1<Y<8 and Y is an integer.

5. A notification method, comprising:
   configuring, by a first base station, a first cell identity for a first cell, wherein the first cell identity comprises a first identifier field and a second identifier field, wherein the first identifier field comprises one or more high-order bits of the first cell identity and the second identifier field comprises one or more low-order bits of the first cell identity;
   configuring a notification information for notifying a reserved bit location information, wherein the notification information containing the reserved bit location information is used to identify the first base station and the first cell in the first cell identity, and wherein the reserved bit location information comprises an X number of reserved bits and a bit order position information, and wherein identifying the first base station and the first cell in the first cell identity based on the reserved bit location information comprises:
   in response to the bit order position information being set to a high-order bit position, determining that all bits in the first identifier fields and the X number of reserved bits of a high-order bits of the second identifier field identify the first base station, and that a remaining bits other than the X number of reserved bits of the high-order bits of the second identifier field identify the first cell; and
   in response to the bit order position information being set to a low-order bit position, determining that all bits in the second identifier field and the X number of reserved bits of a low-order bits of the first identifier field identify the first cell, and that a remaining bits other than the X number of reserved bits of the low-order bits of the first identifier field identify the first base station; and
   notifying, by the first base station, a terminal of the first cell identity.

6. The method according to claim 5, wherein the method further comprises:
   notifying, by the first base station, a second base station or a core network device of a part of the first cell identity that identifies the first base station.

7. The method according to claim 6, wherein the notifying, by the first base station, a second base station or a core network device of a part of the first cell identity that identifies the first base station comprises:
   sending, by the first base station, the first cell identity to the second base station or the core network device; and
   sending, by the first base station, first indication information to the second base station or the core network device, wherein the first indication information indicates a location of the part of the first cell identity that identifies the first base station in the first cell identity.

8. The method according to claim 6, wherein the notifying, by the first base station, a second base station or a core network device of a part of the first cell identity that identifies the first base station comprises:

sending, by the first base station, an identifier of the first base station to the second base station or the core network device.

9. A notification apparatus, wherein the apparatus is disposed on a first base station, and wherein the apparatus comprises:

at least one processor; and a non-transitory computer-readable storage medium coupled to the at least one processor and storing programming instructions for execution by the at least one processor, wherein the programming instructions instruct the at least one processor to:

configure a first cell identity for a first cell, wherein the first cell identity comprises a first identifier field and a second identifier field, wherein the first identifier field comprises one or more high-order bits of the first cell identity and the second identifier field comprises one or more low-order bits of the first cell identity;

configure a notification information for notifying a reserved bit location information, wherein the notification information containing the reserved location bit information is used to identify the first base station and the first cell in the first cell identity, and wherein the reserved bit location information comprises an X number of reserved bits and a bit order position information, and wherein identifying the first base station and the first cell in the first cell identity based on the reserved bit location information comprises:

in response to the bit order position information being set to a high-order bit position, determining that all bits in the first identifier fields and the X number of reserved bits of a high-order bits of the second identifier field identify the first base station, and that a remaining bits other than the X number of reserved bits of the high-order bits of the second identifier fields identify the first cell; and in response to the bit order position information being set to a low-order bit position, determining that all bits in the second identifier field and the X number of reserved bits of a low-order bits of the first identifier field identify the first cell, and that a remaining bits other than the X number of reserved bits of the low-order bits of the first identifier field identify the first base station; and notify a second base station or a core network device of a part of the first cell identity that identifies the first base station.

10. The apparatus according to claim 9, wherein notifying the second base station or the core network device of the part of the first cell identity that identifies the first base station comprises:

sending the first cell identity to the second base station or the core network device; and sending first indication information to the second base station or the core network device, wherein the first indication information indicates a location of the part of the first cell identity that identifies the first base station in the first cell identity.

11. The apparatus according to claim 9, wherein notifying the second base station or the core network device of the part of the first cell identity that identifies the first base station comprises:

sending an identifier of the first base station to the second base station or the core network device.

12. The apparatus according to claim 9, wherein the first cell identity comprises 28 bits, wherein the first identifier field comprises 20 bits, wherein the second identifier field comprises 8 bits, wherein one or more second reserved bits in the second identifier field comprises Y bits, and wherein $1 \leq Y < 8$ and Y is an integer.

13. An apparatus, comprising:

at least one processor; and a non-transitory computer-readable storage medium coupled to the at least one processor and storing programming instructions for execution by the at least one processor, wherein the programming instructions instruct the at least one processor to:

receive a evolved cell global identifier (ECGI) of a first cell notified by a first base station, wherein the ECGI comprises a public land mobile network identity and a first cell identity, wherein the first cell identity comprises a first identifier field and a second identifier field, wherein the first identifier field comprises one or more high-order bits of the first cell identity and the second identifier field comprises one or more low-order bits of the first cell identity;

configure a notification information for notifying a reserved bit location information, wherein the notification information containing the reserved bit location information is used to identify the first base station and the first cell in the first cell identity, and wherein the reserved bit location information comprises an X number of reserved bits and a bit order position information, and wherein identifying the first base station and the first cell in the first cell identity based on the reserved bit location information comprises:

in response to the bit order position information being set to a high-order bit position, determining that all bits in the first identifier fields and the X number of reserved bits of a high-order bits of the second identifier field identify the first base station, and that a remaining bits other than the X number of reserved bits of the high-order bits of the second identifier field identify the first cell; and in response to the bit order position information being set to a low-order bit position, determining that all bits in the second identifier field and the X number of reserved bits of a low-order bits of the first identifier field identify the first cell, and that a remaining bits other than the X number of reserved bits of the low-order bits of the first identifier field identify the first base station; and recognize the first cell based on the received ECGI.

* * * * *

UNITED STATES PATENT AND TRADEMARK OFFICE
CERTIFICATE OF CORRECTION

PATENT NO. : 10,939,285 B2
APPLICATION NO. : 16/045017
DATED : March 2, 2021
INVENTOR(S) : Le Yan et al.

It is certified that error appears in the above-identified patent and that said Letters Patent is hereby corrected as shown below:

In the Claims

In Column 30 Line 12, In Claim 4, delete "1<Y<8" and insert --1≤Y<8--, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*